(12) United States Patent
Faucher et al.

(10) Patent No.: US 8,104,731 B2
(45) Date of Patent: Jan. 31, 2012

(54) OVERHEAD TRACK ANCHOR SYSTEM

(76) Inventors: Martin Faucher, Katevale (CA); Michel Corriveau, Eaton (CA); Michael Moliner, Eastman (CA)

(*) Notice: Subject to any disclaimer, the term of this patent is extended or adjusted under 35 U.S.C. 154(b) by 213 days.

(21) Appl. No.: 11/798,233

(22) Filed: May 11, 2007

(65) Prior Publication Data
US 2007/0215774 A1    Sep. 20, 2007

Related U.S. Application Data

(63) Continuation of application No. 10/342,047, filed on Jan. 10, 2003, now abandoned.

(51) Int. Cl.
*B42F 13/00* (2006.01)
*B61B 3/00* (2006.01)
*B60M 1/04* (2006.01)

(52) U.S. Cl. ............ 248/343; 248/317; 104/89; 104/91; 191/35; 191/33 R

(58) Field of Classification Search .................. 248/317, 248/343, 222.14, 228.1, 320, 323, 222.11, 248/222.12; 191/35, 40, 43, 23 A, 25, 33 R; 410/77, 110; 104/93–94, 89, 91, 106–107, 104/118, 155
See application file for complete search history.

(56) References Cited

U.S. PATENT DOCUMENTS

| | | | | |
|---|---|---|---|---|
| 2,824,913 A * | 2/1958 | Taylor | | 191/43 |
| 3,249,064 A * | 5/1966 | Barry | | 104/93 |
| 3,334,197 A * | 8/1967 | Boden et al. | | 191/40 |
| 3,439,132 A * | 4/1969 | Weber | | 191/35 |
| 3,974,777 A * | 8/1976 | Monne | | 104/94 |
| 4,102,007 A * | 7/1978 | Janson | | 16/94 R |
| 4,137,258 A * | 1/1979 | Moore et al. | | 562/477 |
| 4,318,252 A * | 3/1982 | Janson | | 52/39 |
| 4,768,442 A * | 9/1988 | Miller | | 104/106 |
| 5,051,047 A | 9/1991 | Loncaric | | |
| 5,335,890 A * | 8/1994 | Pryor et al. | | 248/343 |
| 5,653,412 A | 8/1997 | Martorano et al. | | |
| 6,085,368 A | 7/2000 | Robert et al. | | |

FOREIGN PATENT DOCUMENTS

DE     201 12 823 U1    11/2001
GB      2 216 857       10/1989

* cited by examiner

*Primary Examiner* — Tan Le
(74) *Attorney, Agent, or Firm* — Craig A. Fieschko, Esq.; DeWitt Ross & Stevens S.C.

(57) ABSTRACT

A head component for an anchor assembly for mounting a load bearing track to a hanger component attached to an overhead structure (e.g. a ceiling or ceiling structure), the track comprising a rail element and a mounting element, the mounting element comprising one or more retaining formations, each retaining formation defining a holding cavity and an (cavity) opening communicating with the holding cavity, the holding cavity being sized larger than the (cavity) opening communicating therewith, the head component comprising a support member and a flarable member, the flarable member being attached to and flarable from the support member, the head component being sized and configured such that the head component is able to pass through the (cavity) opening into the holding cavity wherein the flarable member is able to flare (i.e. to open or spread) outwardly so as to present a flared formation in the holding cavity sized larger than the cavity opening so as to inhibit withdrawal of the head component in the holding cavity back through the (cavity) opening.

57 Claims, 22 Drawing Sheets

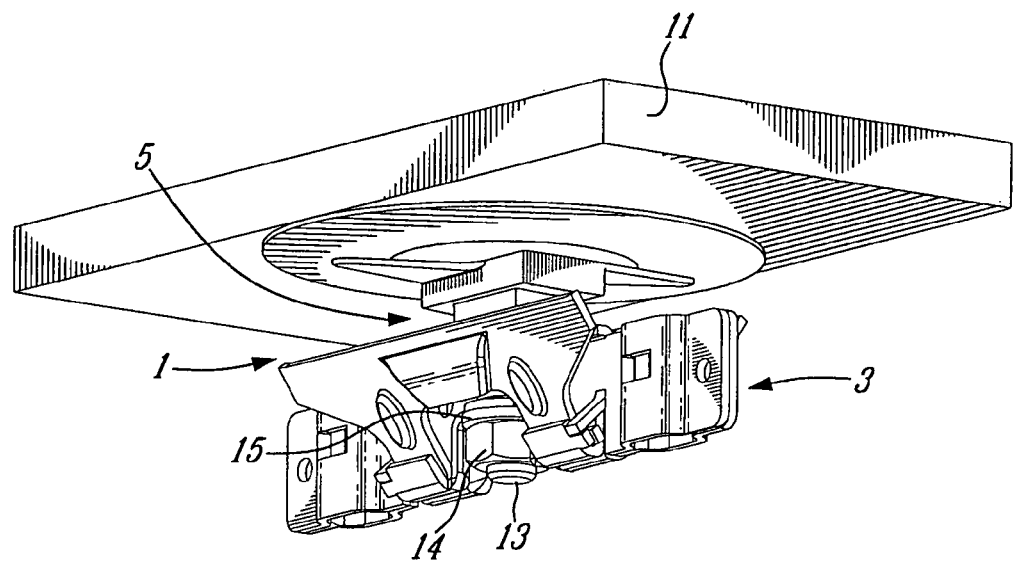
FIG_1
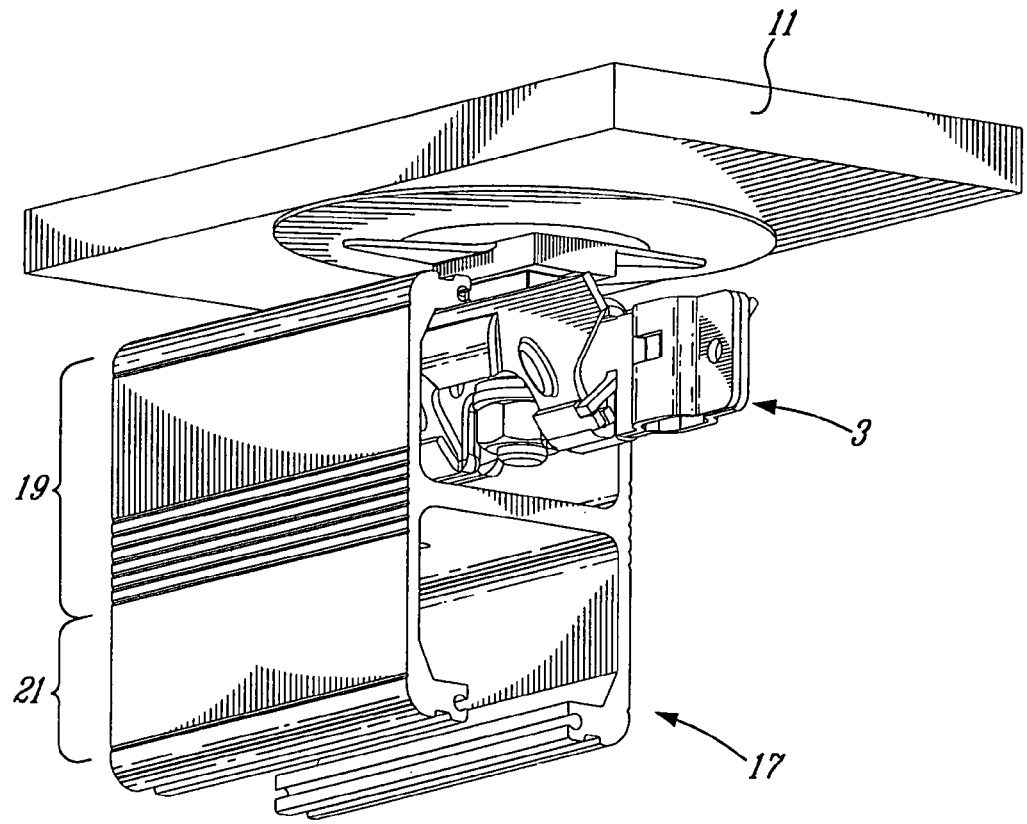
FIG_2

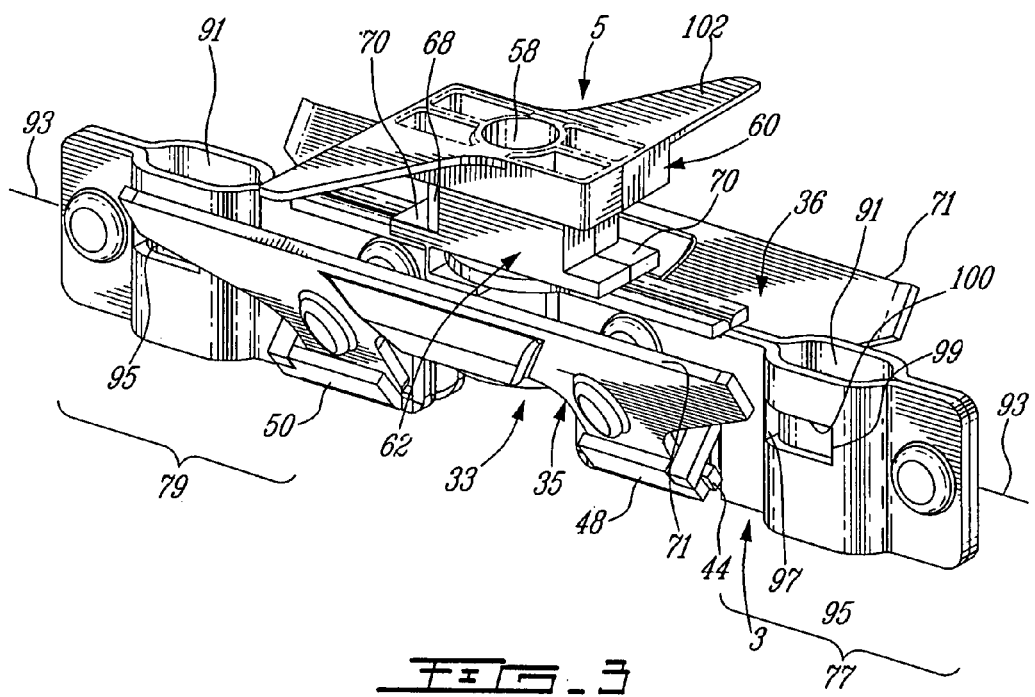
FIG_3
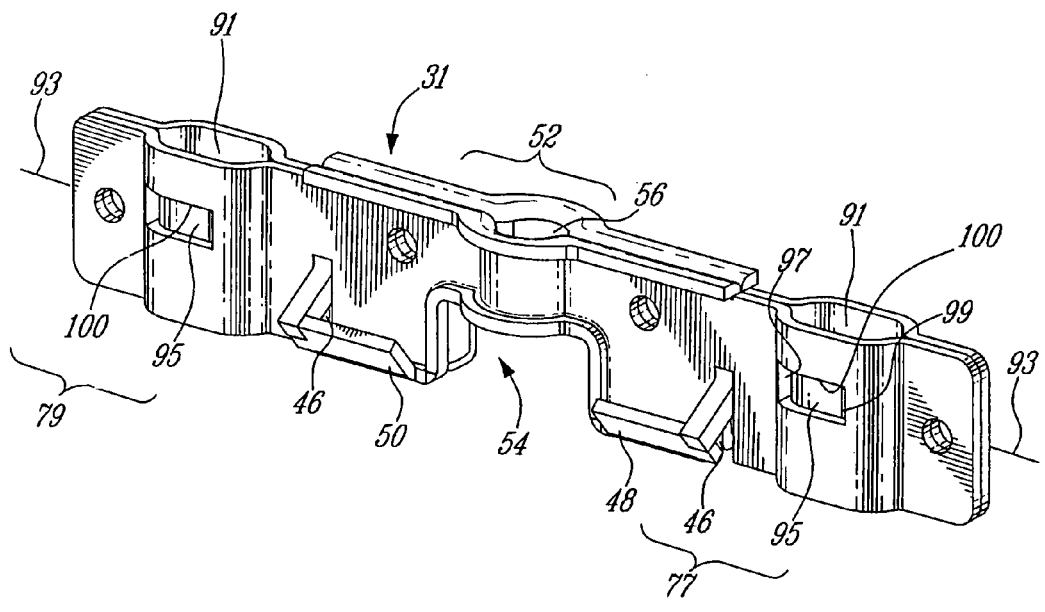
FIG_4

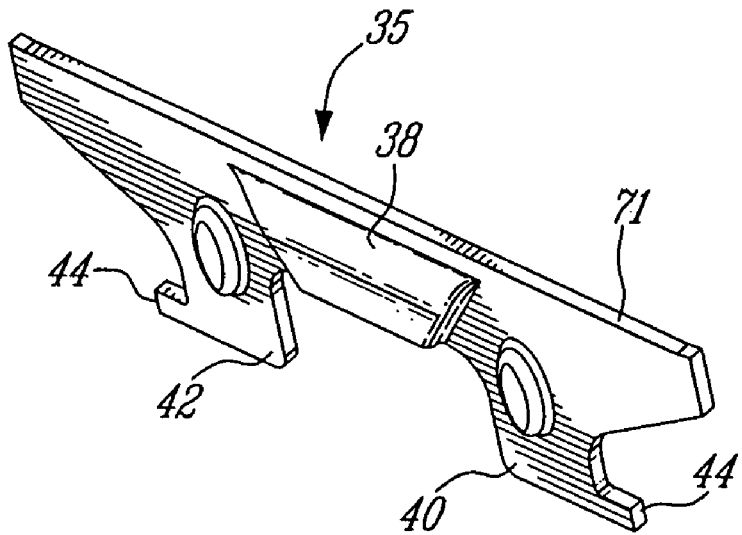
FIG_5
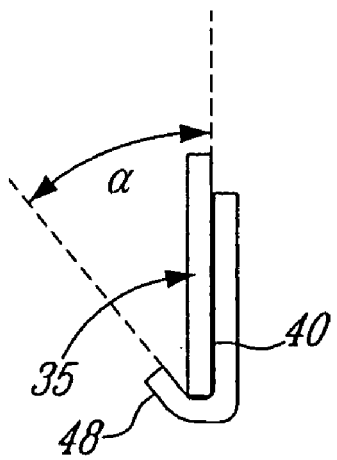
FIG_6

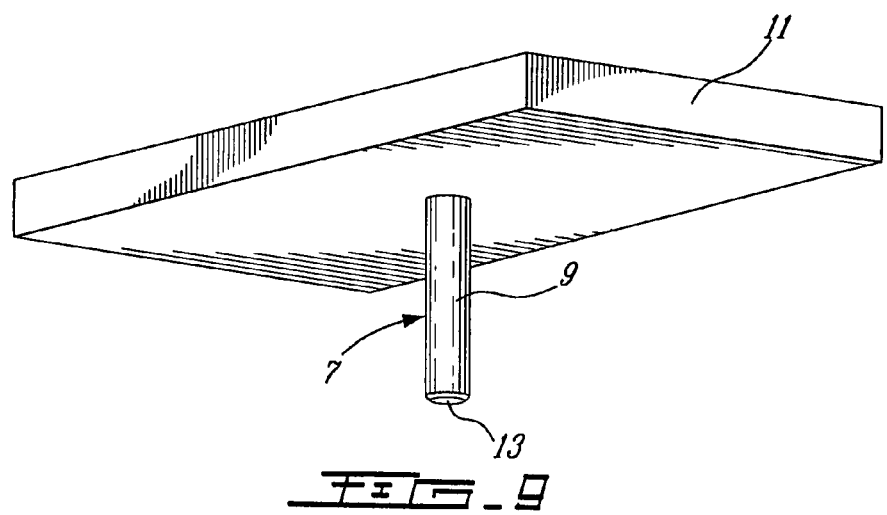
_FIG_9
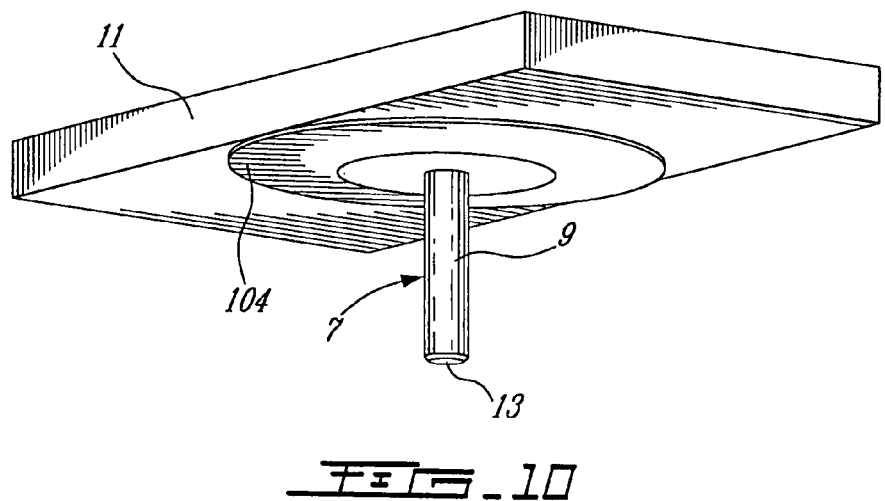
_FIG_10
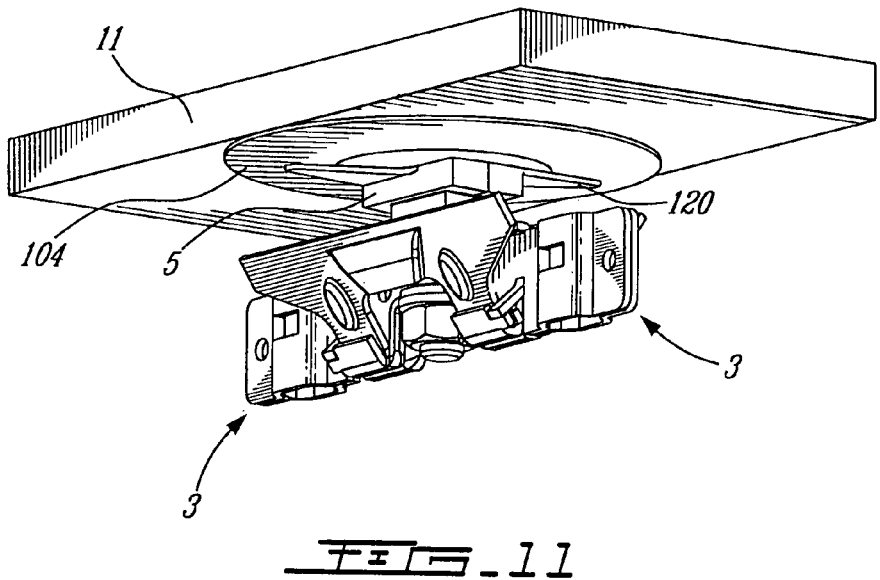
_FIG_11

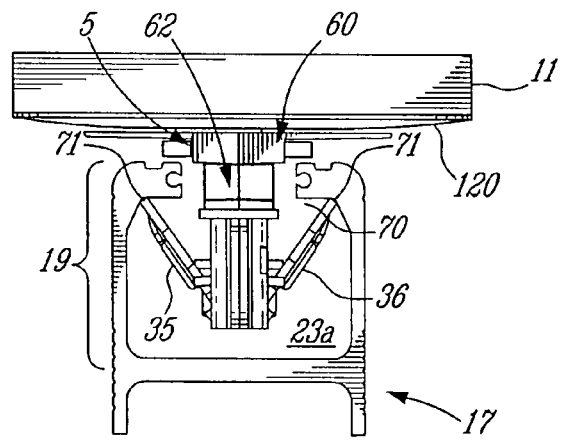
FIG_14
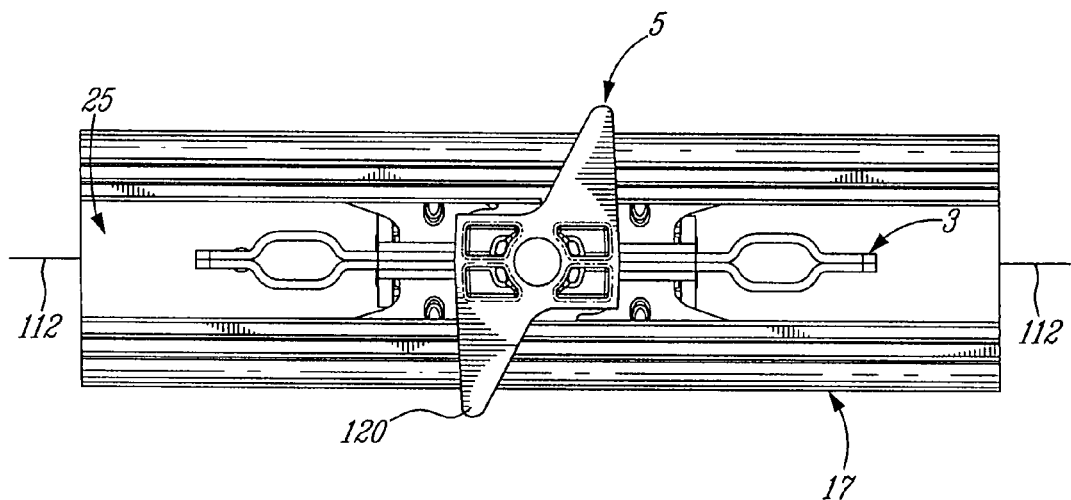
FIG_15

FIG_25

FIG_26

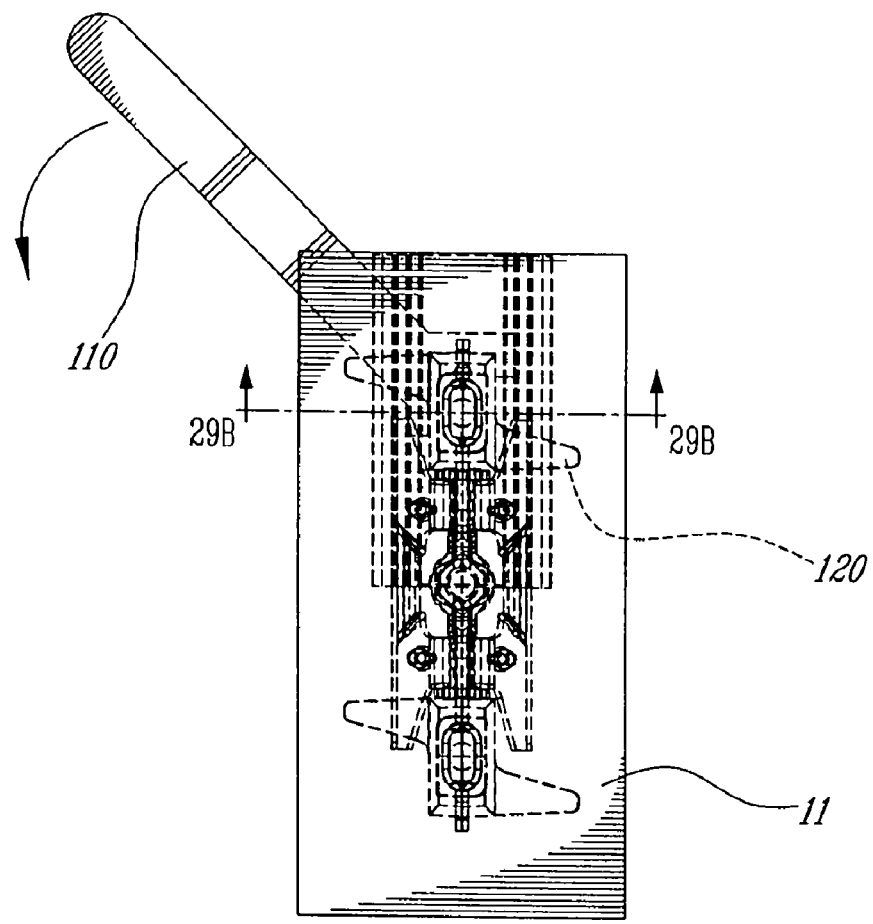
FIG_29A
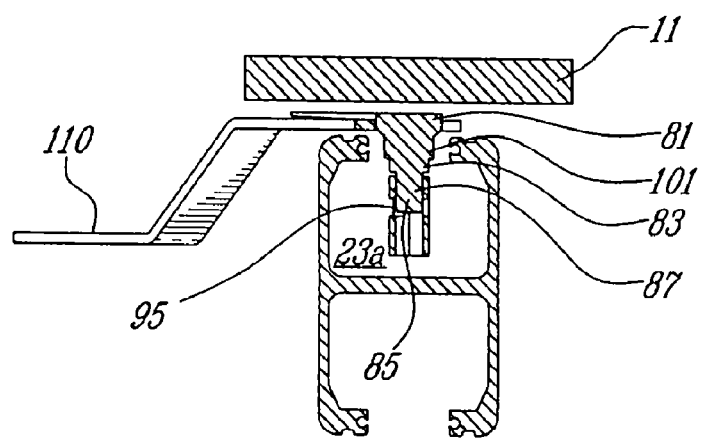
FIG_29B

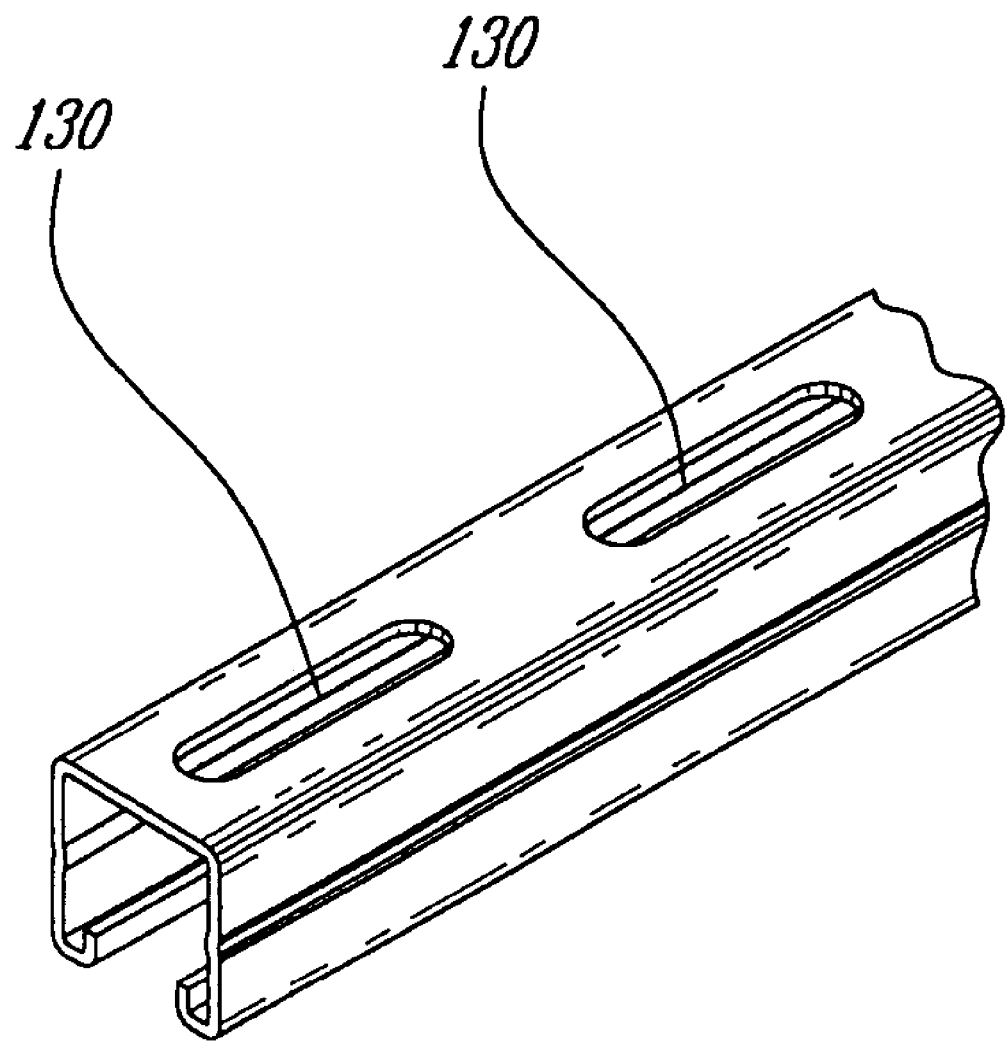
FIG_32

OVERHEAD TRACK ANCHOR SYSTEM

The present is a continuation of U.S. patent application Ser. No. 10/342,047 filed on Jan. 10, 2003 now abandoned.

The present invention relates to mechanisms for the fixation of support runners, tracks, rails and the like to an overhead structure and in particular for the for fixation of runners, tracks, rails and the like for lifting and transferring loads. The overhead structure may for example be the ceiling in room, corridor and the like of buildings such as hospitals, residential and long-term care centers, residential custodial care facilities as well as private homes.

Overhead support and displacement structures are known, for example, for lifting and transferring loads as well as for maintaining fixtures such as lighting devices in place (for the latter please see U.S. Pat. No. 5,653,412).

Overhead handling systems are, in particular, known for lifting and transferring people. Such systems may comprise a trolley component and an overhead track component for guiding the trolley along a predetermined path. A trolley component may take on any suitable (known) form which allows it to be supported by and glide along a track component, i.e. such that a trolley component may be moved manually along the track or may be so moved by providing a suitable motorized trolley displacement system; please also see for example U.S. Pat. No. 6,085,368 which relates to a winch for such a person handling system (the entire contents of which is hereby incorporated by reference). Overhead track components are also known wherein a track is either directly bolted or otherwise fixed to the ceiling of a room. The fasteners for an overhead track component may, for example, be an extruded latch bracket such as is disclosed in GB 2216857. They are built in the runner and used frequently with bolting components. In any case such fasteners are bolted in some manner to the ceiling support structure There is a continuing need to have relatively easily installable overhead track structures for supporting a person and in particular for a track support structure which can be used to raise, displace and lower a (e.g. incapacitated) person e.g. displace a person between a bed or chair and a bath area etc.; such support structures may be needed in many environments such as in private homes, hospitals, rehabilitation centres, group homes for the aged, etc.

Accordingly it would be advantageous to have an attachment means or mechanism by which an overhead track support may be relatively easy to install. It would also be advantageous to have such a mechanism which would facilitate the removal of the track once initially set in place. It would be further advantageous to have an attachment means which could be used to provide an esthetic attachment of a track to a ceiling.

Although the anchoring mechanism of the present invention will be described hereinafter with respect to overhead track systems for displacing a person, it is to be understood that the anchoring mechanism may be used in the context of overhead track support systems for the displacement of other types of loads as well as for merely supporting objects which are not necessarily to be intended to be (regularly) displaced along a track.

STATEMENT OF INVENTION

The present invention in accordance with an aspect provides a head component for an anchor assembly for mounting a load bearing track to a hanger component attached to an overhead structure (e.g. a ceiling or ceiling structure),
said track comprising a rail element and a mounting element, said mounting element comprising one or more retaining formations, each retaining formation defining a holding cavity and an (cavity) opening communicating with the holding cavity, said holding cavity being sized larger than the (cavity) opening communicating therewith,
the head component comprising a support member and a flarable member, said flarable member being attached to and flarable from said support member,
said head component being sized and configured such that said head component is able to pass through said (cavity) opening into said holding cavity wherein the flarable member is able to flare (i.e. to open or spread) outwardly so as to present a flared formation in the holding cavity sized larger than the cavity opening so as to inhibit withdrawal of the head component in the holding cavity back through the (cavity) opening.

In accordance with the present invention the flarable member may take on any desired or necessary form or configuration, keeping in mind the purpose thereof, namely, to jam in a holding cavity of a mounting element for mounting a load bearing track to a hanger component attached to an overhead structure (e.g. a ceiling or ceiling structure).

In accordance with the present invention a head component as defined herein may comprise a connection member for releaseably connecting the support member to said hanger component.

The present invention in accordance with another aspect provides an anchor assembly for mounting a load bearing track to an overhead structure (e.g. a ceiling or ceiling structure),
said track having a longitudinal extent (i.e. length dimension) and comprising a rail element and a mounting element, said mounting element comprising one or more retaining formations, each retaining formation defining a holding cavity and an (cavity) opening communicating with the holding cavity, said holding cavity being sized larger than the (cavity) opening communicating therewith,
the anchor assembly comprising
   a hanger component (shank) attached to an overhead structure (e.g. a ceiling or ceiling structure)
and
   a head component
said head component comprising, a support member and a flarable member, said support member being connected to the hanger component, said flarable member being attached to and flarable from said support member,
said head component being sized and configured such that said head component is able to pass through a said (cavity) opening into said holding cavity wherein the flarable member is able to flare (i.e. to open or spread outwardly) so as to present a flared formation in the holding cavity sized larger than the (cavity) opening so as to inhibit withdrawal of the head component in the holding cavity back through the opening.

In accordance with the present invention an anchor assembly as defined herein may comprise a lateral stabilization component, said lateral stabilization component comprising an attachment member (e.g. sleeve opening) connecting the lateral stabilization component to the hanger component, said lateral stabilization component being displaceable between a non-wedging configuration and a lodging or wedging configuration in the opening for inhibiting lateral (i.e. wobble) movement of the mounting element transverse to the longitudinal extent of the track.

In accordance with a further aspect the present invention provides a combination (kit), for mounting a load bearing track to an overhead structure (e.g. a ceiling or ceiling structure), said load bearing track having a longitudinal extent and comprising a rail element and a mounting element, said mounting element comprising one or more retaining formations, each retaining formation defining a holding cavity and a respective (cavity) opening communicating with the holding cavity, said holding cavity being sized larger than the respective (cavity) opening communicating therewith, said combination (kit) comprising one or more head components, each head component comprising a support member and a flarable member attached to and flarable from said support member, said head component being sized and configured such that said head component is able to pass through a respective (cavity) opening into said holding cavity wherein the flarable member is able to flare (i.e. to open or spread outwardly) so as to present a flared formation in the holding cavity sized larger than the respective (cavity) opening so as to inhibit withdrawal of the head component in the holding cavity back through said respective (cavity) opening and one or more members selected from the class consisting of
a hanger component for attaching a respective head component to the overhead structure (e.g. a ceiling or ceiling structure)
and
a section of said load bearing track.

In accordance with the present invention a combination (kit) as defined herein may comprise one or more hanger component for attaching a respective head component to the overhead structure (e.g. a ceiling or ceiling structure); and/or one or more sections of said load bearing track In accordance with the present invention the rail element and said mounting element may integral; alternatively they may be releasably attachable in any suitable (known) manner.

In accordance with the present invention a mounting element may comprise one or more retainer formations each defining a discrete (slot-like) opening, i.e. a mounting element may comprise a plurality (i.e. two or more) of discrete (cavity) openings and in particular a plurality (i.e. two or more) of discrete elongated slot-like (cavity) openings. On the other hand a mounting element may comprise an elongated retainer formation extending the longitudinal extent of the track, said elongated retainer formation defining a slot-like (cavity) opening extending the longitudinal extent of the track.

In accordance with the present invention a combination as defined herein may comprise one or more a lateral stabilization components, each said lateral stabilization component comprising an attachment member (i.e. opening) connecting the lateral stabilization component to a respective hanger component, said lateral stabilization component being displaceable between a non-wedging configuration and a lodging or wedging configuration in the slot-like (cavity) opening for inhibiting lateral movement of the mounting element transverse to the longitudinal extent of the track.

As mentioned above, the flarable member may take on any desired form or configuration keeping in mind its intended purpose. Thus for example the flarable member may comprise two or more wing blade or plate members such as described herein by way of example only.

In a more particular aspect the present invention provides a head component for an anchor assembly, for mounting a load bearing track to a hanger component attached to an overhead structure (e.g. a ceiling or ceiling structure), said track comprising a rail element and a mounting element, said mounting element comprising one or more retaining formations, each retaining formation defining a holding cavity and a (cavity) opening communicating with the holding cavity, said holding cavity being sized larger than the opening communicating therewith, the head component comprising a support member and a pair of opposed engagement (i.e. support) wing blade (plate) members, each of said wing blade members being pivotally attached to the support member by a respective pivot connect member, said head component being sized and configured such that said head component is able to pass through said opening into said holding cavity wherein each of the wing blade members are able to pivot outwardly in said holding cavity so as to each engage the retaining formation to create a respective truss formation which acts as a reverse wedge to resist pull out of the head component from the holding cavity through the opening, said truss formation having a base chord defined by the retaining formation, a side chord defined by the wing blade member and a center strut defined by the support member.

In accordance with the present invention a wing blade or plate member may comprise a single unit as described by way example herein below. However, if desired or necessary a wing plate or blade member may comprise two or more individual sub-units; in this case wing plate or blade member as well as the pivot connect member a respective pivot connect member must be configured or adapted as necessary keeping in mind the purpose of the wing blade members, i.e. to be able to enter the holding cavity and jam the head component in a holding cavity so as to inhibit removal of the head component back out the (cavity) opening.

In accordance with the present invention a head component may a or may not be provided with biasing means for biasing the wing blade members in a flared position. The head component may be provided with stop elements for arresting the rotation of the wing blade members beyond a desired or predetermined angle, i.e. the rotation is constrained between a predetermined range of angular displacement about of rotation. If desired the retaining formation may include in the holding cavity members which serve to limit such rotation of the wing blade members, e.g. if no stop members is provided for this purpose, i.e. to facilitate engagement between the portion of the retaining formation defining the (cavity) opening so as to form said truss structure(s).

In an additional aspect the present invention provides an anchor assembly, for mounting a load bearing track to an overhead structure (e.g. a ceiling or ceiling structure), said track having a longitudinal extent (i.e. length dimension) comprising a rail element and a mounting element, said mounting element comprising one or more retaining formations, each retaining formation defining a holding cavity and an (cavity) opening communicating with the holding cavity, said holding cavity being sized larger than the (cavity) opening communicating therewith, the anchor assembly comprising
a hanger component (shank) attached to an overhead structure (e.g. a ceiling or ceiling structure)
and
a head component
said head component being as defined above as comprising wing blade (plate) members, said support member being connected to said hanger component.

The present invention provide an anchor assembly as defined herein wherein when the (cavity) opening has a slot-like configuration and a longitudinal extent, the anchor assembly further comprises a lateral stabilization component, said lateral stabilization component comprising a head member, for gripping the lateral stabilization element for the rotation thereof, and an insert member extending from said head member, said insert member having a rectangular configuration and comprising a pair of opposed outer long sides and a pair of opposed outer short sides said insert member being configured such that said insert member is insertable into the slot-like opening when the long sides of the insert member extend parallel to the longitudinal extent of the slot-like opening, and is pivotable—rotatable in the slot-like opening with respect to the longitudinal extent of the opening so as to dispose the long sides of the insert member transverse to the longitudinal extent of the rail such that the short sides of the insert member engage the retaining formation defining the slot-like opening so as to (or for) inhibit(ing) lateral (sideways) movement of the mounting element transverse (i.e. movement in a direction transverse (e.g. at right angles-perpendicular)) to the longitudinal extent of the track.

In accordance with the present invention an anchor assembly as defined herein may be one wherein the hanger component comprises a shank member having a longitudinal extent, said head and insert members define a sleeve body having a sleeve opening, said shank member extending through said sleeve opening, said sleeve body and said shank member being configured for rotational displacement of the lateral stabilization component about the longitudinal extent of the shank member (i.e. about the longitudinal axis of the shank member).

In accordance with the present invention an anchor assembly as defined herein may be one wherein the insert member comprises a pair of opposed tab members, each tab member extending from a respective short side of the insert member, said insert member being configured such that said tab members are insertable through the slot-like (cavity) opening into the holding cavity, said tab members, said wing blade members and said retaining formation being configured such that when the tab members are in the holding cavity and the short sides of the insert member are made to engage the retaining formation each wing blade member is engaged by (i.e. sandwiched or pinched between) a respective tab member and the retaining formation.

In accordance with the present invention an anchor assembly as defined herein may comprise a compression inducing component for placing the wing blade members under compression stress between the retaining formation and said pivot connect member.

In accordance with the present invention an anchor assembly as defined herein may be one wherein said anchor assembly comprises a pair of opposed base members, each base member projecting from a respective side of said support member, a pair of brace members and a pair of cam members, each brace member comprising a head member and a distal engagement member, each base member being associated with a respective brace member and a respective cam member, each base member and respective brace and cam members being configured such that said head member is able to abut the outside surface of the portion of the retaining formation defining said opening, said distal engagement member is able to pivotally-rotationally engage said base member and when said brace member is rotated said cam member places said brace member under tension stress so as to urge said pivot connect member to urge said wing blade members connected thereto against the retaining formation and thereby placing the wing blade members under compression stress between the retaining formation and said pivot connect member.

In accordance with the present invention an anchor assembly as defined herein may comprise a stabilization component, the stabilization component comprising a head member, for gripping the stabilization element for the rotation thereof, and an insert member extending from said head member, the insert member comprising a pair of opposed tab members spaced apart from (e.g. disposed at an end of the insert member distal from the end thereof connected to) the head member, said insert member and the opening being configured such that said insert member including said tab members is insertable into opening with the tab members extending parallel to the longitudinal axis-direction of the rail such that said tab members are insertable through the slot-like opening into the holding cavity, and said tab members, said wing blade members and said retaining formation being configured such that when the tab members are in the holding cavity said insert member including said tab members is pivotable-rotatable with respect to the longitudinal extent of the opening so as to dispose the tab members transverse to the longitudinal axis of the rail such that each wing blade member is engaged by (i.e. sandwiched between) a respective tab member and the retaining formation.

In accordance with a further particular aspect the present invention provides a combination (kit), for mounting a load bearing track to an overhead structure (e.g. a ceiling or ceiling structure), said load bearing track having a longitudinal extent and comprising a rail element and a mounting element, said mounting element comprising one or more retaining formations, each retaining formation defining a holding cavity and a respective (cavity) opening communicating with the holding cavity, said holding cavity being sized larger than the respective (cavity) opening communicating therewith, said combination (kit) comprising one or more head components as comprising (support) wing blade (plate) members, and one or more members selected from the class consisting of a hanger component for attaching a respective head component to the overhead structure (e.g. a ceiling or ceiling structure)

and a section of said load bearing track.

In accordance with the present invention as desired or necessary a stop element may be provided for limiting the wing blade member(s) to a predetermined degree of rotation relative to the support member, e.g. once the wing blade members are in a holding cavity they may unfold outwardly by a predetermined degree of rotation. The head component itself may for example be provided with such a stop element; the stop element may comprise a plurality of sub-units, e.g. each wing blade member may be associated with a respective stop element unit. Also by way of example the holding cavity itself may comprise such a stop element. As a further example both the head component and the holding cavity may be provided with such stop element units.

In accordance with the present invention a lateral stabilization component and/or a brace member may be provided with alignment indicator members, the visibility of which from below is indicative of whether or not a lateral stabilization component or a brace member has been rotated, i.e. the visibility of the indicator members from below is indicative that a lateral stabilization component or a brace member has not been rotated to a locking position as discussed by way of example herein; on the other hand if an indicator member is hidden from view by the track this is indicative that a lateral stabilization component or a brace member has been rotated to a locking position.

An anchor assembly of the present invention may advantageously be used by a single person for the mounting of a track attachable thereto to a ceiling or other overhead structure since the head component once inside the holding cavity will already maintain the track in place.

In drawings which illustrate example embodiments of aspect of the present invention:

FIG. 1 is a perspective view of an example anchor assembly in accordance with the present invention:

FIG. 2 is a perspective view of an example track mounted to the anchor assembly shown in FIG. 1;

FIG. 3 is an enlarged perspective view of the head component and lateral stabilization component of the an example anchor assembly shown in FIG. 1;

FIG. 4 is an enlarged perspective view of the support member for the head component shown in FIG. 3;

FIG. 5 is an enlarged perspective view of a wing plate or blade for the head component shown in FIG. 3;

FIG. 6 is an enlarged partial sectional view showing the stop element of the head component shown in FIG. 3;

FIG. 9 is a perspective view of an example hanger component extending downwardly out of a false ceiling for the anchor assembly as shown in FIG. 1;

FIG. 10 is a perspective view of an example hanger component associated with an example abutment plate or disc for the anchor assembly as shown in FIG. 1, the hanger component extending downwardly out of plate attached to the false ceiling;

FIG. 11 is an additional perspective view of the example anchor assembly shown in FIG. 1:

FIG. 14 is a schematic partial sectional view illustrating the anchor assembly of FIG. 11 with the head component thereof being disposed in the holding cavity of the mounting element of the track shown in FIG. 12;

FIG. 15 is a top view of the anchor assembly and track as shown in FIG. 14 with the false ceiling taken away;

FIG. 29A is a view from above through the false ceiling of the track and anchor assembly as shown in FIG. 28 but wherein one of the tracks is not shown;

FIG. 29B is a schematic partial sectional view along 29B-29B of FIG. 29A;

FIG. 32 is a partial perspective view of an example embodiment of another type of track for being mounted with an anchor assembly of the present invention;

Figure 34:
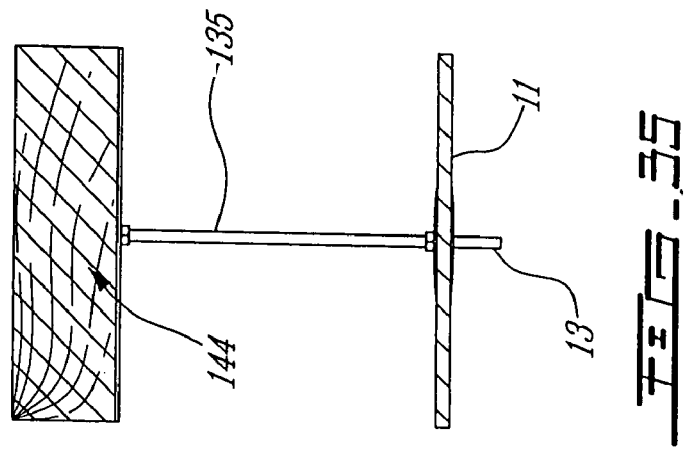
Figure 35:
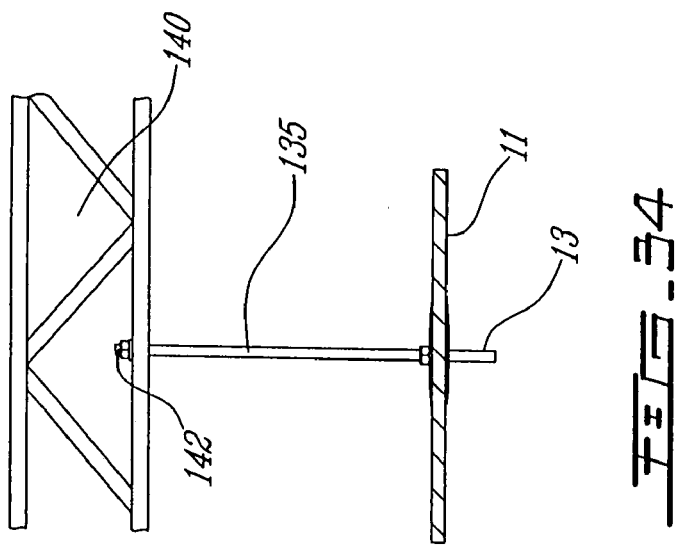
Figure 33:
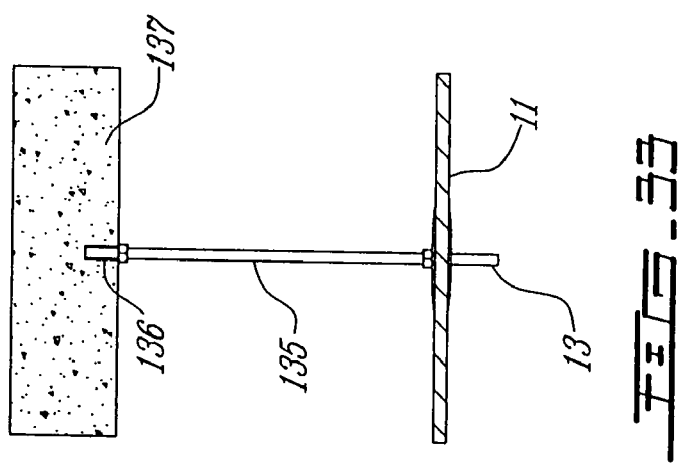

FIG. 33 is a schematic partial sectional view of a hanger component attached at an upper end to a concrete type overhead support structure FIG. 34 is a schematic partial sectional view of a hanger component attached at an upper end to a girder type overhead support structure; and FIG. 35 is a schematic partial sectional view of a hanger component attached at an upper end to a wood type overhead support structure Turning to FIGS. 1, 2 and 9, FIG. 1 illustrate, an example embodiment of an anchor assembly 1 in accordance with the present invention. The anchor assembly 1 comprises a track anchor head component designated generally by the reference numeral 3, a lateral stabilization component designated generally by the reference numeral 5 and a hanger component. Referring to FIG. 9 the hanger component is designated generally by the reference numeral 7. The hanger component 7 comprises a threaded shank or shaft 9. One end (i.e. the upper end) of the shank (not shown) is connected to the ceiling or ceiling structure in any known or suitable manner examples of which shall be described in more detail below; as may also be seen, for illustration purposes FIGS. 1 and 9 as well as other figures mentioned herein a portion of a false or suspended ceiling 11 will be shown. The head component 3 is connected to other or lower end 13 of the threaded shank or shaft 7 and is releasably held thereto by a bolt/washer combination, wherein the bolt is designated by the reference numeral 14 and the washer by the reference numeral 15.

FIG. 2 shows the anchor assembly 1 of FIG. 1 associated with a track 17 the side walls of which are partially cut away so as to show the C-shaped cross section of the mounting element 19 and the lower rail element 21 as well as the disposition of the head component 3 in the holding cavity 23a of the mounting element 19 of the track 17 For the example track 17 shown, the mounting element 19 is integral with the rail element 21 and each as mentioned above are of C-shaped cross section. Referring also to FIGS. 12 to 18, the side walls 23 and 24 of the mounting element 19 function as an elongated retaining formation in that they define the elongated holding cavity 23a and an elongated slot (cavity) opening 25; more particularly the side walls 23 and 24 have free edge portions 27 and 29 which are bent inwardly towards each other and are spaced apart so as to define said elongated slot (cavity) opening 25. As may be seen (for example from FIG. 12) the holding cavity 23a defines a space which is larger or wider in extent than the elongated slot (cavity) opening 25, i.e. the width of the cavity 23a is larger than the space or distance between the free edge portions 27 and 29 defining the slot (cavity) opening 25. The rail element may be used to engage a displaceable trolley component such as is described in U.S. Pat. No. 6,085,368.

Turning to FIGS. 3 to 6, these Figures illustrate the head component 3, and more particularly its support member 31 and its flarable member 33. FIG. 3 also shows the head component in association with the example lateral stabilization component 5 which shall be described below in more detail.

The flarable member 33 comprises a pair of opposed engagement wing blades or plates 35 and 36, each wing blade or plate 35 and 36 being pivotally attached to the support member 31 by a respective two part pivot connect member on a side of the support member 31 opposite to the other wing plate member. As may be seen from FIG. 5 each of the wing plates 35, 36 comprises a wing body 38 from which a pair of spaced apart foot elements 40 and 42 extend; the wing body 38 and foot elements 40, 42 give the wing plate a generally U-shaped appearance. A pivot pin or toe element 44 extends outwardly from each foot element 40, 42. As may be seen from FIG. 4, the pivot connect member for wing plate 35 comprises a pair of opposed pin or toe openings 46 for pivotally engaging a respective pin or toe element 44 of the wing blade or plate 35 (see also FIG. 3 which shows the pin or toe element 44 disposed in a respective pin or toe opening 46); the openings 46 are each defined by an upper projection and a lower stop element 48 or 50.

The pivot connect member for wing plate 35 as mentioned also includes, adjacent each pin opening, an angled stop element 48 or 50; the stop elements 48, 50 are configured and angled so as to be able to engage a respective foot element 40, 42 so as to allow the wing plate 35 to only be able to pivot up to a predetermined rotational angle $\alpha$ as shown in FIG. 6 with respect to the support member 31, i.e. the wing plate 35 is only able to fold outwardly and inwardly within a predetermined degree of rotation relative to the support member 31. The angle $\alpha$ is of course to be chosen keeping in mind the purpose of the wing plates, i.e. to participate in the provision of a truss structure as described herein (e.g. the rotational angle $\alpha$ may be from about 0 to about 30 degrees or less).

For the retaining structure set forth in the figures the stop elements 48, 50 may if desired be configured for a greater degree (e.g. an angle $\alpha$ of from about 0 to about 45 degrees or less) or lesser degree (e.g. an angle $\alpha$ of from about 0 to about 25 degrees or less) of rotation of the wing plate 35 or even be dispensed with entirely provided that a lower support element is maintained for defining the lower portion of the pin openings 46. In the absence of the stop elements the wing plate 35 will be free to rotate to a greater degree; however, in such case the mounting of a track 17 to such a head component 3 will require more manipulation by an installer since the installer will have to manually configure the wing plate 35 disposition for insertion of the head component 3 through the (cavity) opening 25 of a mounting element 19.

On the other hand if the width dimension of the holding cavity is larger than the unfolded (horizontal) extent of a wing blade member, the retaining formation should be configured to include one or more blocking members which are so disposed so as to maintain the wing blade members in an upwardly extending configuration in the holding cavity such as set forth in the figures whereby the ends of the wing blade member may act on the upper free edge portions of the to create a truss structure. Such a blocking structure may alternatively be incorporated or associated with a wing member itself. In any event, the purpose of the wing blade members should always be kept in mind as well as their ability to fold up for passage through the (cavity) opening 25 or any other opening which may be used by a mounting element and once in the holding cavity to fold outwardly a sufficient degree so as to participate in the provision of a truss structure as described herein. The other wing plate or blade 36 and its respective pivot connect member (hidden from view) are of the same construction described above with respect to the wing plate 35 and its pivot connect member.

The central portion 52 of the support member 31 which separates the stop elements 48, 50 defines a recessed space 54 and is provided with an attachment opening 56 (i.e. a connection member) for receiving the end 13 of the threaded shank. The attachment opening 56 communicates with the recessed space 54; the so defined recessed structure is to act as a recessed seat for receiving the bolt/washer combination 14/15 when the bolt 14 thereof is threaded to the end 13 of the shank passing through the attachment opening 56 for releasably attaching the support member 31 to the lower end 13 of the shank (i.e. to the hanger component) (see FIG. 1).

Figure 7:
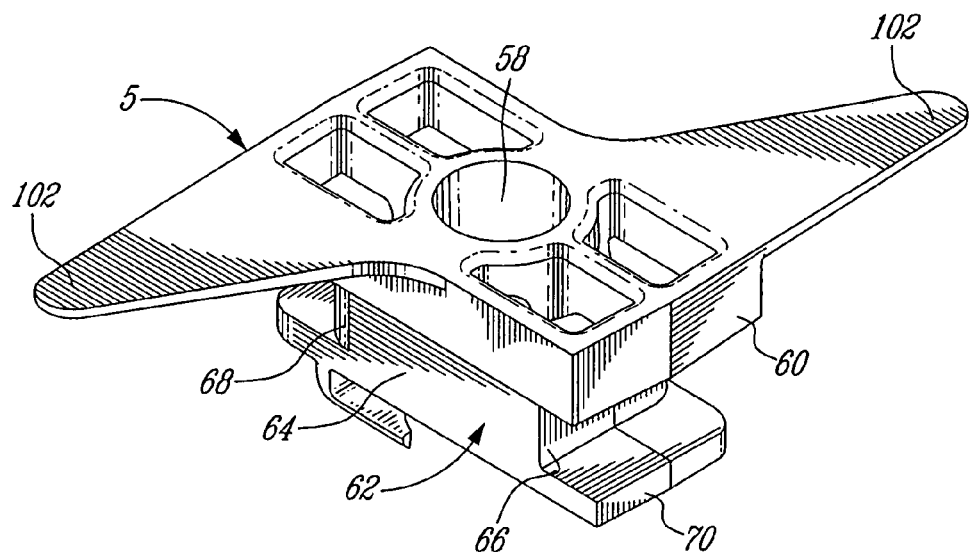
FIG. 7 is a perspective view of the lateral stabilization component as shown in FIG. 3.

Turning to FIG. 7 (as well as FIG. 2), an example embodiment of a lateral stabilization component 5 is illustrated. The lateral stabilization component 5 has an attachment member which in the embodiment shown comprises a sleeve opening 58. More particularly, the lateral stabilization component 5 comprises a head member 60, for gripping the lateral stabilization element for the rotation thereof, and an insert member 62 extending from the head member 60; i.e. the head and insert members define a sleeve body which defines the above mentioned sleeve opening 58.

The sleeve opening 58 is used for connecting the lateral stabilization component 5 to the hanger component (i.e. to end 13 of the shank). The lateral stabilization component 5 as shall be discussed in more detail below is displaceable about the shank between a non-wedging configuration and a lodging or wedging configuration in the slot like (cavity) opening 25 of the mounting element 19 for inhibiting lateral (i.e. wobble) movement of the mounting element 19 transverse to the longitudinal extent of the track 17.

The insert member 62 has a rectangular configuration and comprises a pair of opposed outer long sides 54 and a pair of opposed outer short sides 66. Diagonally opposed corners 68 of the insert member 62 are beveled or rounded to facilitate rotation of the insert member 62 in the mounting element (cavity) opening 25 as shall be discussed below. The insert member 62 shown also comprises a pair of opposed tab members 70, each tab member 70 extending from a respective short side 66 of the insert member 62. Each tab member 70 is spaced apart from a respective opposite portion of the head member 60, by a portion of the insert member 62 so as to define an open ended U-shaped like structure. The U-shaped like structure is configured such that when the insert member 62 is in the above mentioned wedging configuration in the slot like (cavity) opening 25, a respective free edge portion 27 (or 29) extends into the opening of the U-shaped like structure such that not only does the short side 66 of the insert member 62 embrace (i.e. engages) the respective free edge portion 27 (or 29) but so does the tab member 70 and the opposed portion of the head member (see for example FIGS. 22 and 23). Alternatively, if desired or necessary, the tab member and the opposed portion of the head member may be so spaced apart that one or both of them is not able to embrace the above mentioned respective free edge portion 27 (or 29). Furthermore as the tab members 70 are rotated from their initial in-line position (i.e. in-line with the longitudinal extent of the slot (cavity) opening 25) into their final transverse position they will tend to urge the wing plates 35, 36 apart to ensure that the upper edges 71 of the wing plates 35, 36 extend well into the holding cavity 23a under respective free edge portions 27 (or 29) of the retaining formation (see FIG. 23).

The anchor assembly 1 of course may comprise one or more other stabilization components which are of different or similar configuration to the lateral stabilization component 5 described above; such different stabilization component 5 may be used in place of the lateral stabilization component described above or, as shall be described herein, in addition thereto. Such other stabilization components may thus, for example, provide the above mentioned wedging function as well as a clamping function (as discussed below); alternatively the other stabilization components instead of providing both of such functions may only provide one of them, e.g. the clamping function. The clamping function may, in particular, be exploited to provide the anchor assembly with a track interconnection ability, i.e. the anchor assembly may be used to interconnect adjacent tracks 17, as shall be explained below, wherein each track 17 has an end retaining formation of C-shaped cross-section disposed at an end of the rail thereof, the ends of the arms of the C-shape defining a first slot-like (cavity) opening 25, the end retaining formation further defining at the end of the mounting element 19 a respective end C-shaped opening communicating with said holding cavity 23a. A suitably configured anchor assembly may thus further acti as a track interconnection component for interconnecting respective end retaining formations of two tracks 17, the ends of the rails thereof being juxtaposed (see for example FIG. 26).

Figure 8:
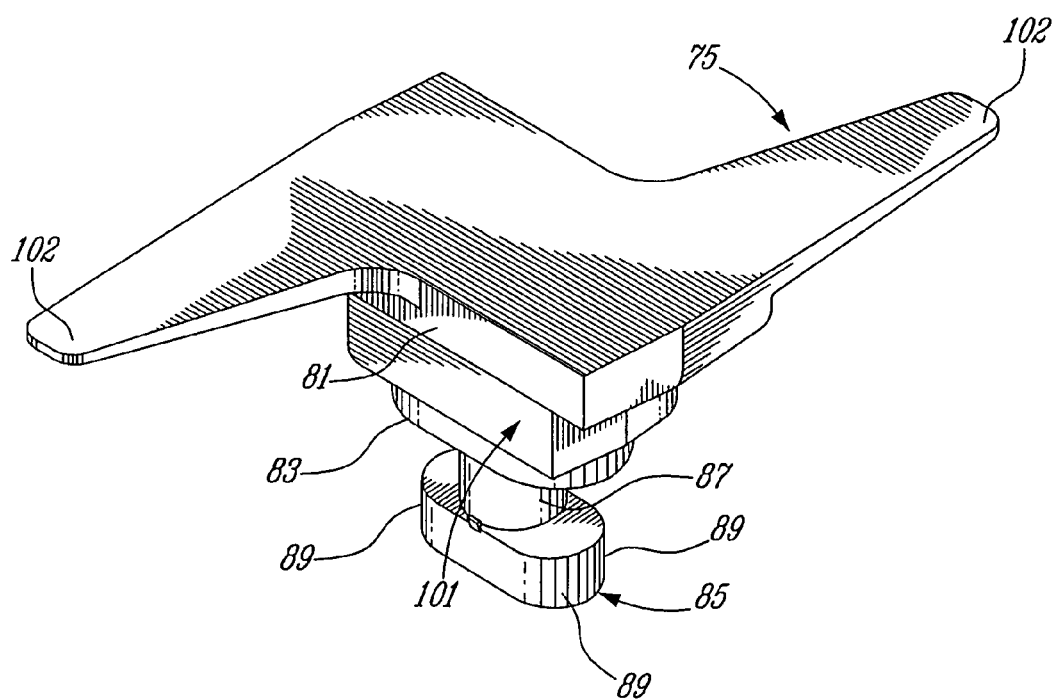
FIG. 8 is a perspective view of an example brace member for use as part of an example of a further type of stabilization component for the anchor assembly as shown in shown in FIG. 1.

Such an alternate stabilization component may exploit a brace member 75 as illustrated in FIG. 8. If so, the support member 31 may as illustrated in FIGS. 3 and 4, also or in the alternative be associated with a pair of base members 77 and 79 which are connected to the support member 31 on opposite sides thereof. The base members 77 and 79 are each intended to cooperate with a respective brace member 75 for (releasably) urging the pivot connect member(s) to urge the wing blades 35, 36 connected thereto against the retaining formation and thereby placing the wing blades 35, 36 under compression stress between the retaining formation and said pivot connect member (i.e. to provide a type of clamping action wherein the retaining formation is sandwiched between the brace members 75 and the wing plates 35, 36).

Referring back to FIG. 8 each brace member 75 comprises a head member 81, for gripping the connector member for the rotation thereof, an intermediate member 83 and a distal (i.e. foot) engagement member 85 which is connected to the intermediate member 83 by a stem member 87; the distal (i.e. foot) engagement member 85 has a longitudinal extent, i.e. it has a rectangle-like shape with rounded corners 89.

As may be seen in FIGS. 3 and 4, each base member 77 (and 79) has a primary opening or cavity 91 which extends longitudinally more or less parallel to the attachment opening, 56 the cross section of the primary opening 91 has a shape complementary to the shape of the foot engagement member 85 such that the longitudinal extent thereof is parallel to the longitudinal extent of the support member 31 (i.e. both extend along the axis designated by the reference numeral 93 in FIGS. 3 and 4). The intermediate member 83 is sized larger than the mouth of the primary opening 91. On the other hand the foot member 85 when its longitudinal extent is aligned or lined up with the longitudinal extent of the support member 31 (see axis 93) is sized and configured so as to be able to enter the primary opening 91 just sufficiently to be disposed adjacent opposed cam openings 95. The side walls defining a primary opening 91 also define the opposed cam openings or slots 95; i.e. each primary opening 91 is associated with a pair of opposed cam openings 95. The cam openings 95 are configured for receiving the above mentioned (i.e. foot) engagement member 85. The cam openings 95 are each wider at one side thereof but with the narrow portion of one cam slot being opposite the wider portion of the opposed cam slot, i.e. referring to cam slot 95 for base member 77 the shown slot 95 gradually narrows down from side 97 to the other side 99. The upper engagement surfaces 100 of the opposed cam slots 95 thus can act as an overall cam surface for urging a downward displacement of the (i.e. foot) engagement member 85 when the foot engagement member 85 is rotated such that its longitudinal extent is transverse to the longitudinal extent of the support member, (i.e. transverse to the axis 93 in FIGS. 3 and 4)

Returning to FIG. 8 each brace member 75 as illustrated additionally is provided with an insert member 101 extending from the head member 81 so as to be between the intermediate member 83 and the head member 81. The insert member 101 for the brace member 75 has the same configuration as the insert member 62 for lateral stabilization component 5 described above (see FIG. 7); the insert member 101 for the brace member 75 thus also has a rectangular configuration and comprises a pair of opposed outer long sides, a pair of opposed outer short sides as well as a pair of diagonally opposed round corners. Thus, the insert member 101 for the brace member 75 can provide for the same sort of lateral stability as that of the lateral stabilization component 5. According to an alternative embodiment, the insert member 101 for the brace member 75 may, on the other hand, be sized and configured to present a body smaller than the slot (cavity) opening 25 of the mounting element 19 such that rotation of the brace member 75 does not bring about a wedging of its insert member 101 in the slot (cavity) opening 25.

Figure 31A:
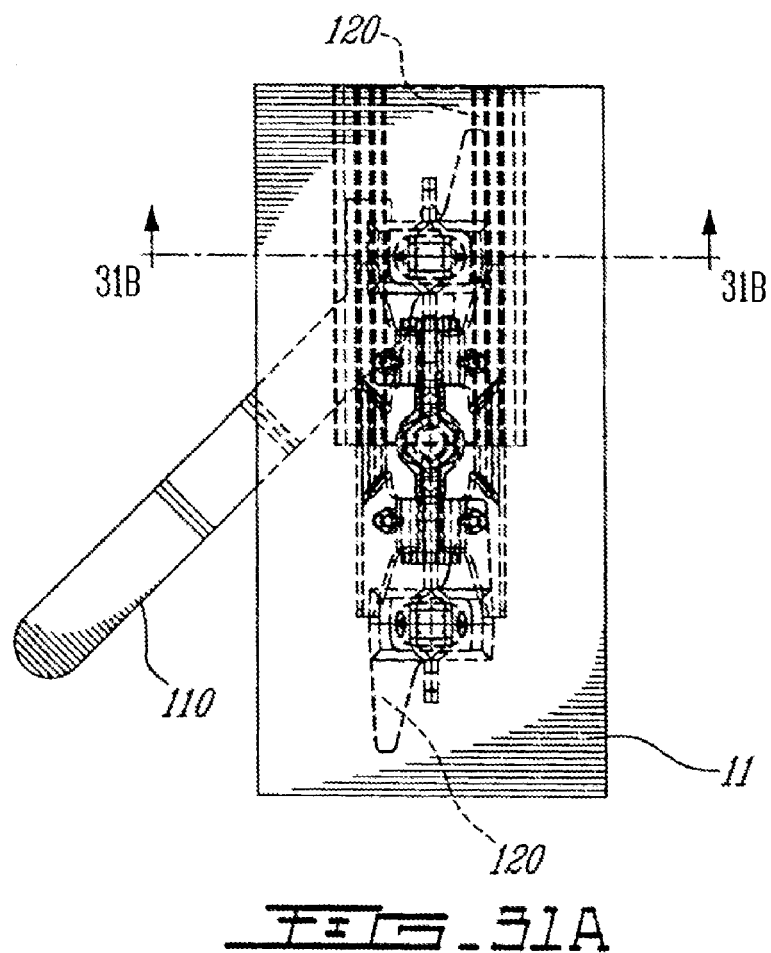
FIG. 31A is the same view as shown in FIG. 29A but wherein the brace member has been fully rotated and is wedged in the elongated slot opening of the mounting element.

The head members 60 and 81 for the lateral stabilization component 5 and the brace members 75 are shown in FIGS. 7 and 8 as being provided with gripping wings 102 for being gripped by the fingers of an installer for rotation of thereof; these wings 102, if present, may also serve as indicators that the associated lateral stabilization component 5 or brace member 75 has or has not been rotated into a locking configuration, i.e. namely, if the wings 120 are aligned as shown in FIG. 29 so as to be visible from below then there is no wedging but if the wings are aligned as shown in FIG. 31 so as to be hidden from view from below then an insert member is wedged in the slot (cavity) opening 25 as discussed herein. The gripping wings 102 may alternatively be dispensed with in which case rotation may be solely induced by that use of a suitable tool such as the wrench like tool shown in FIGS. 18 and 19.

The FIGS. 9 to 15 show the steps for the formation of the anchor assembly 1 i.e. the installation or connection of various elements of the anchor assembly to the shank which has been previously connected to the ceiling overhead structure. As may be seen the shank projects out of the surface of a false ceiling 11 (FIG. 9); see below for various connection type for the shank to a ceiling or ceiling structure. As shown in FIG. 10, a disc shaped abutment plate 104 having a central opening through which the shank extends may first be attached to the ceiling surface (e.g. by any suitable known attachment means e.g. screws); i.e. the shank is slipped through the central opening of the disc and the disc is placed against the ceiling surface where after screws (not shown) are then passed through screw openings (not shown) in the plate and screwed in place so as to secure the disc up against the ceiling surface.

Turning to FIG. 11, a head component 3 associated with a lateral stabilization component 5 (as shown in FIG. 3) is slipped onto the end 13 of the shank i.e. the end 13 of the shank is passed through the sleeve opening 58 of the stabilization component 5 and then through the attachment opening 56 of the support member 31 whereupon the bolt/washer combination 14/15 is attached to the end 13 of the shank, i.e. the bolt 14 is screwed onto the end 13 of the shank with the washer 14 previously set in place about the shank Once the head component 3 is attached to the shank, the anchor assembly 1 is as shown in FIG. 11; in this configuration the lateral stabilization component 5 abuts the support member 3 as well as the disc plate 104 but is still able to be rotated about the shank.

Alternatively, the head component 3 may also be associated with a pair of brace members 75 so as to provide an anchor assembly 106 (see FIG. 24) with the above mentioned other stabilization component(s).

Turning to FIGS. 12 to 15, these figures illustrate the mounting of a track to the anchor assembly shown in FIG. 11. The track comprises a mounting element and a rail element each of which as mentioned above is of C-shaped cross section. The side walls of the mounting element function also as mentioned above, as an elongated retaining formation in that they define an elongated holding cavity and an elongated slot opening; more particularly the side walls have free edge portions which are bent inwardly towards each other and are spaced apart so as to define said elongated slot (cavity) opening. As may be seen the holding cavity defines a space which is larger in extent than the elongated slot opening, i.e. the width of the cavity is larger the space or distance between the free edge portions defining the slot (cavity) opening.

As may be understood from the FIGS. 12 to 15, the head component 3 is sized and configured such that the head component 3, when its longitudinal extent is placed parallel to the longitudinal extent of the elongated slot (cavity) opening, is able to pass through slot (cavity) opening 25 into the holding cavity 23a wherein the flarable member (i.e. wing plates 35, 36) is able to flare (i.e. to open or spread outwardly) so as to present a flared formation in the holding cavity 23a sized larger than the (cavity) opening 25 so as to inhibit withdrawal of the head component 3 in the holding cavity 23a back through the (cavity) opening 25

Figure 12:
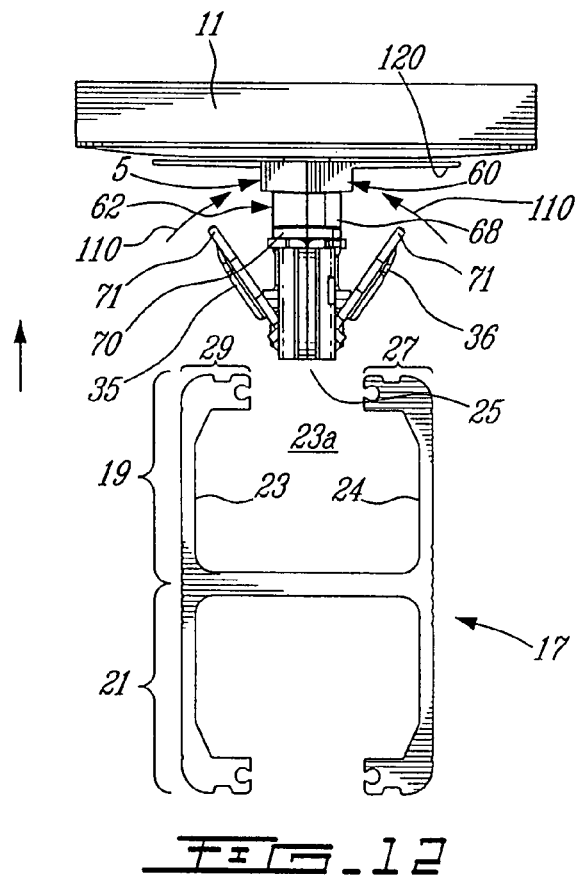
FIG. 12 is a schematic partial sectional view illustrating the anchor assembly of FIG. 11 and a track being advanced upwardly toward the head component.
Figure 13:
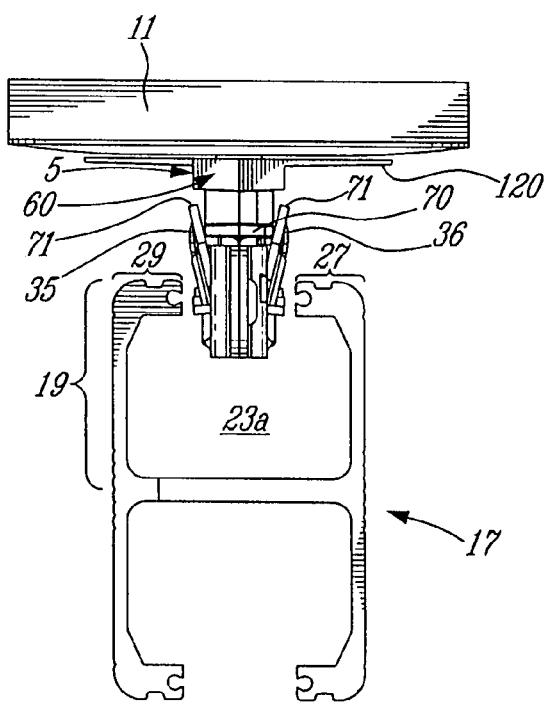
FIG. 13 is a schematic partial sectional view illustrating the anchor assembly of FIG. 11 with the head component thereof being advanced into the slot opening of the mounting element of the track shown in FIG. 12.

More particularly, FIGS. 12 to 15 show the progressive insertion of the head component 3 through the slot (cavity) opening 25 into the holding cavity 23a and the ultimate disposition of the head component 3 in the holding cavity 23a of the mounting element 19 of the track 17. Thus FIG. 12 shows the head component 3 with its longitudinal extent lined up with the longitudinal extent of the slot (cavity) opening 25. As the slot opening 25 is displaced upwardly in the direction of the arrow 108 towards the head component 3, the wing plates 35, 36 thereof eventually impinge upon the free edge portions 27, 29 defining the slot opening 25 and are displaced inwardly in the direction of the arrows 110. As the wings plates 35 and 36 are folded up the head component 3 as seen in FIG. 13 proceeds through the slot (cavity) opening 25. As shown in FIG. 14 once the ends 71 of the wing plates 35, 36 have cleared the free edge portions 27, 29 (i.e. are below the free edge portions 27, 29) and are in the holding cavity 23a they will tend to fall outwardly (under gravity) to present a flared formation in the holding cavity 23a larger than the slot (cavity) opening 25.

As may be understood from FIGS. 12 to 15 the head component 3 is sized and configured such that the head component 3 is able to pass through the slot (cavity) opening 25 into the holding cavity 23a wherein each of the wing blades 35, 36 are able to pivot outwardly in said holding cavity 23a so as to each engage the retaining formation to create a respective truss-like formation which acts as a reverse wedge to resist pull out of the head component from the holding cavity through the opening; the truss-like formation comprises an assemblage of members arranged in a triangle or combination of triangles to form a rigid framework. Thus referring to FIG. 15 each of the truss-like formations has a base chord defined more or less by a respective free edge portion 27, 29 of the retaining formation, a side chord defined by the wing blade 35, 36 and a center strut defined by the support member 31.

Figure 16:
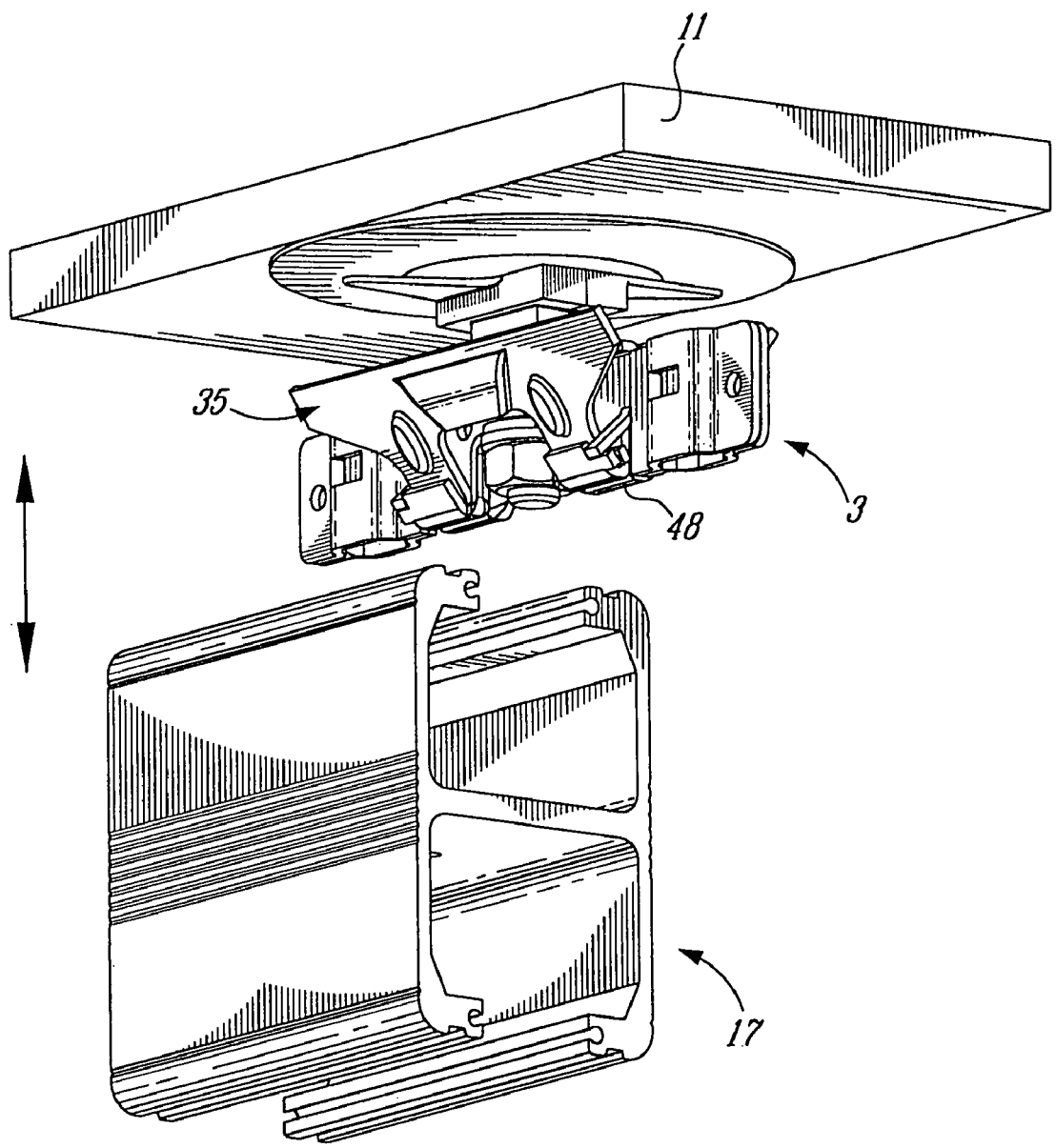
FIG. 16 is a perspective view of an example track being mounted to the anchor assembly shown in FIG. 1.
Figure 17:
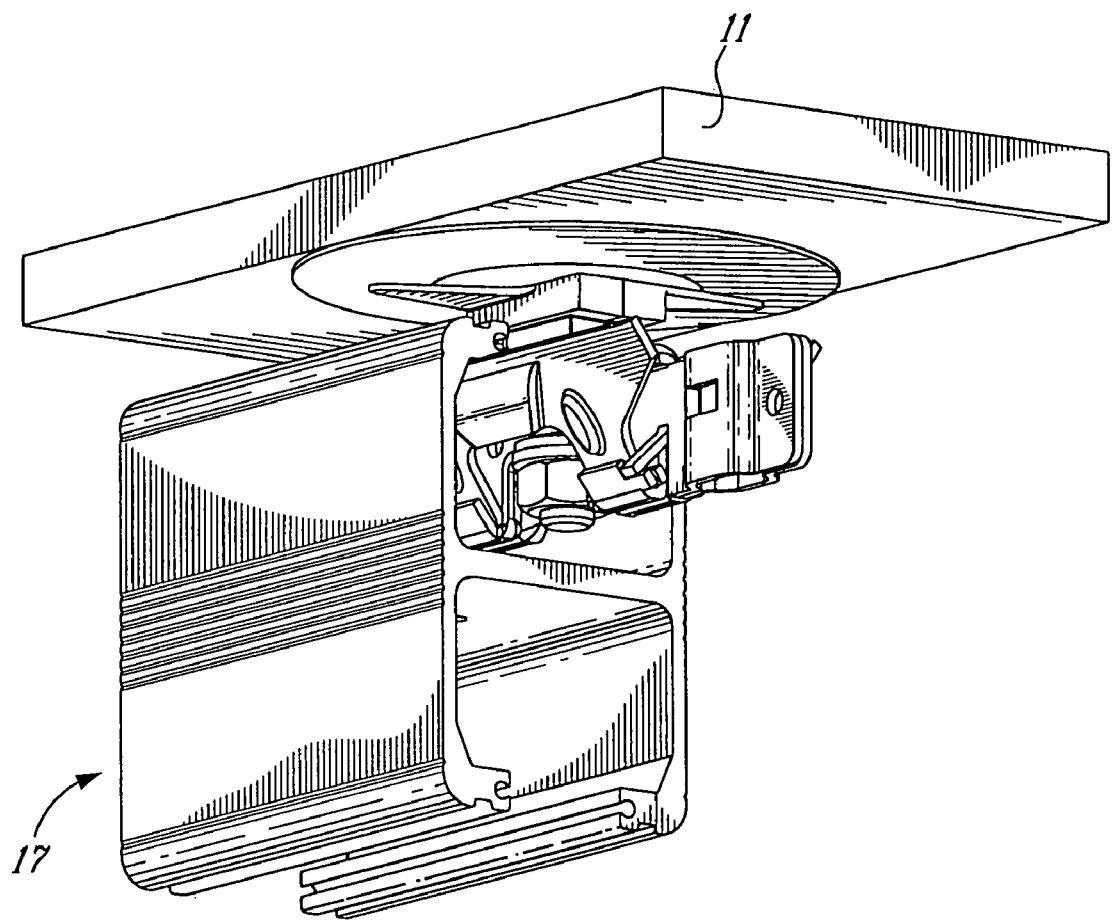
FIG. 17 is a perspective view of the example track shown in FIG. 16 mounted to the anchor assembly shown in FIG. 16.
Figure 18:
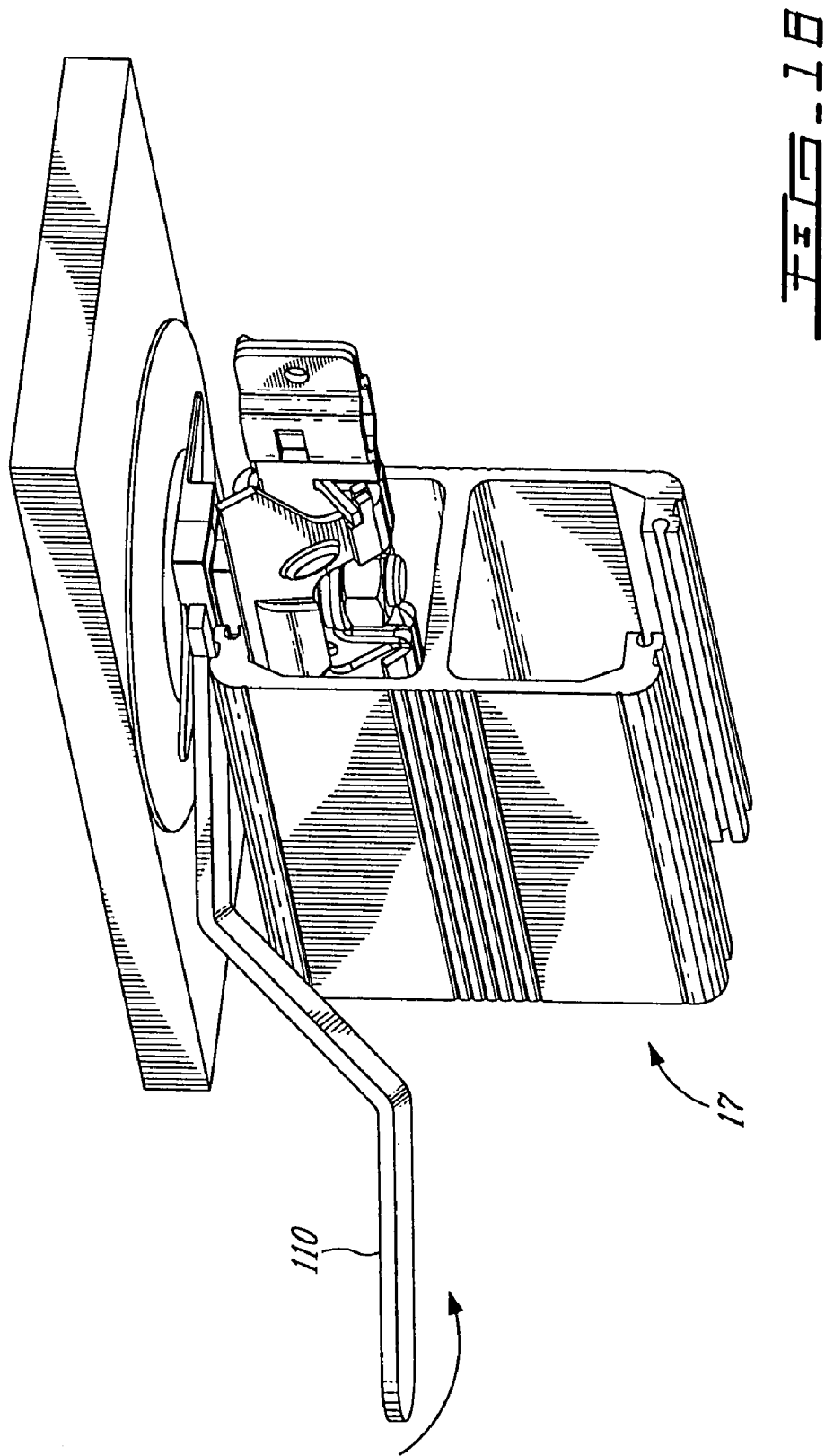
FIG. 18 is a perspective view the track and anchor assembly as shown in FIG. 16 associated with turning tool for rotation of the lateral stabilization component.

FIGS. 16 and 17 are perspective views illustrating the insertion of the head component 3 through the slot (cavity) opening 25 into the holding cavity 23a as shown above in FIGS. 12 to 14

Figure 19:
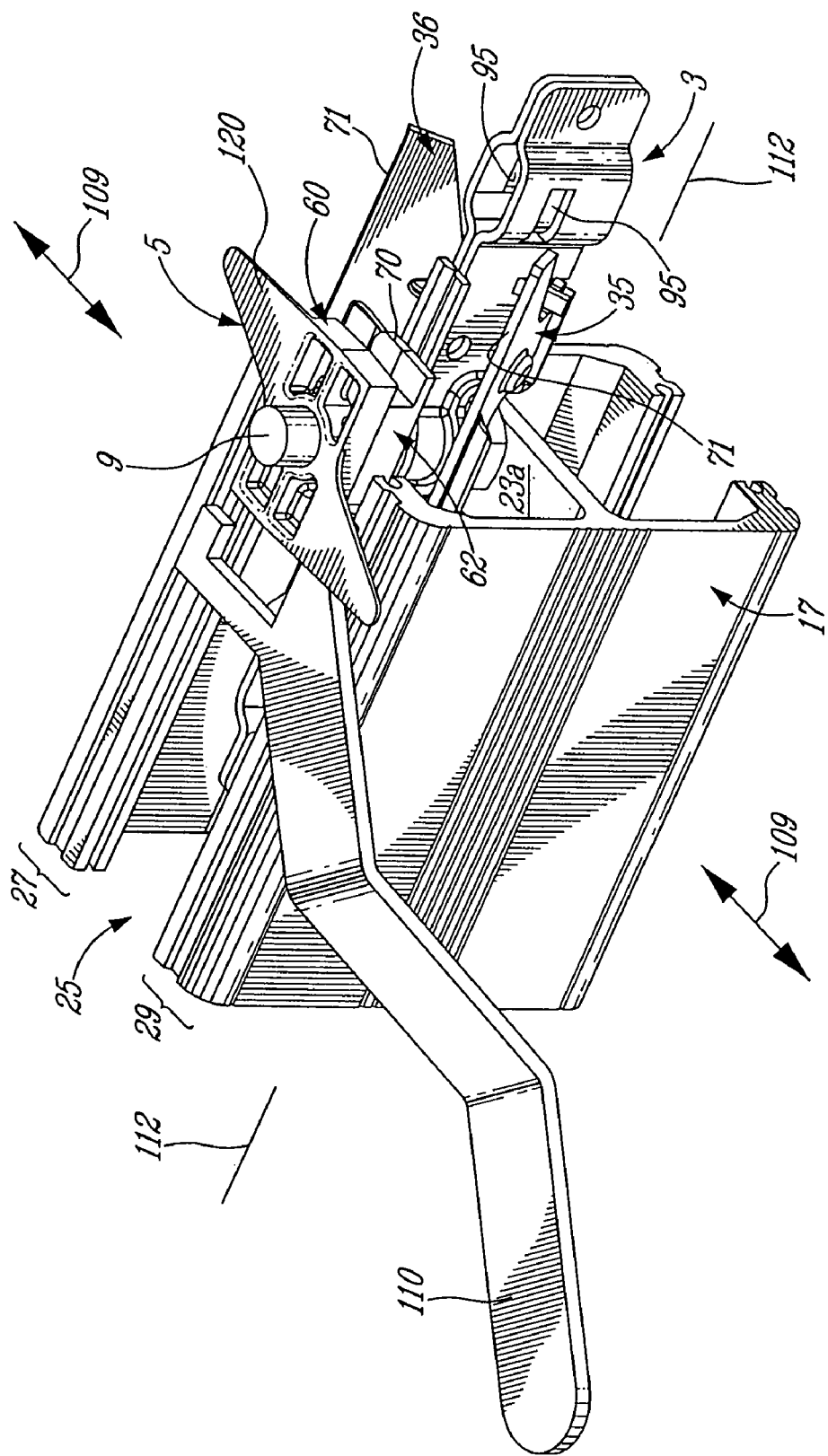
FIG. 19 is an enlarged perspective view as shown in FIG. 18.

With the head component 3 in the holding cavity 23a, the mounting element 19 (and thus the track 17 as a whole) may still wobble laterally along its longitudinal extent (in the direction of the arrows 109) about the head component 3 (see FIG. 19). Accordingly, it is desirable to inhibit such movement and recourse for this purpose may be made to the lateral stabilization element.

Figure 20:
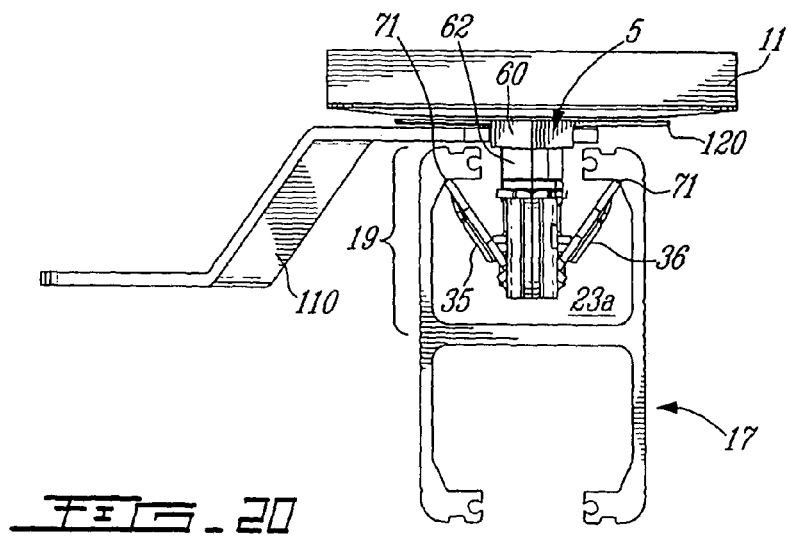
FIG. 20 is a schematic partial sectional view illustrating the anchor assembly as shown in FIG. 19.
Figure 21:
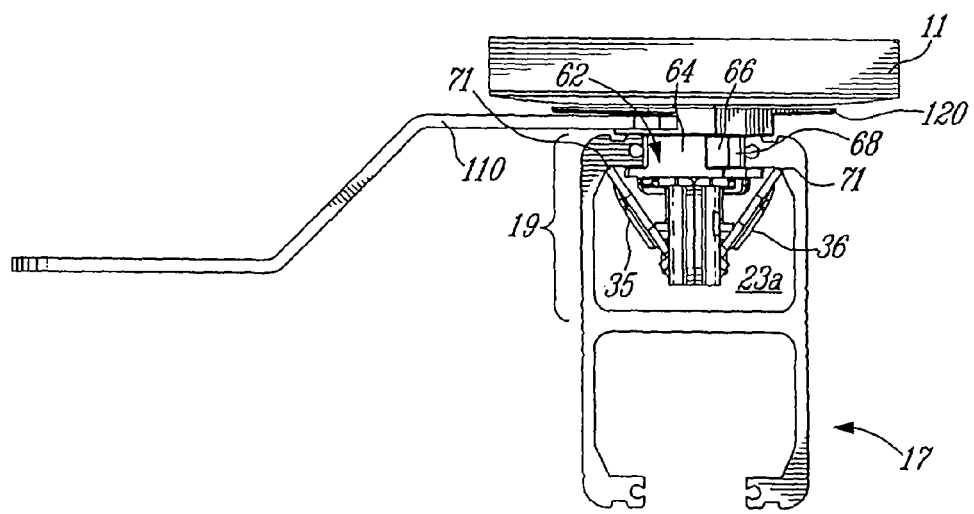
FIG. 21 is the same schematic partial sectional view shown in FIG. 20 but wherein the lateral stabilization component has been partially rotated for ultimate wedging in the elongated slot opening of the mounting element.
Figure 22:
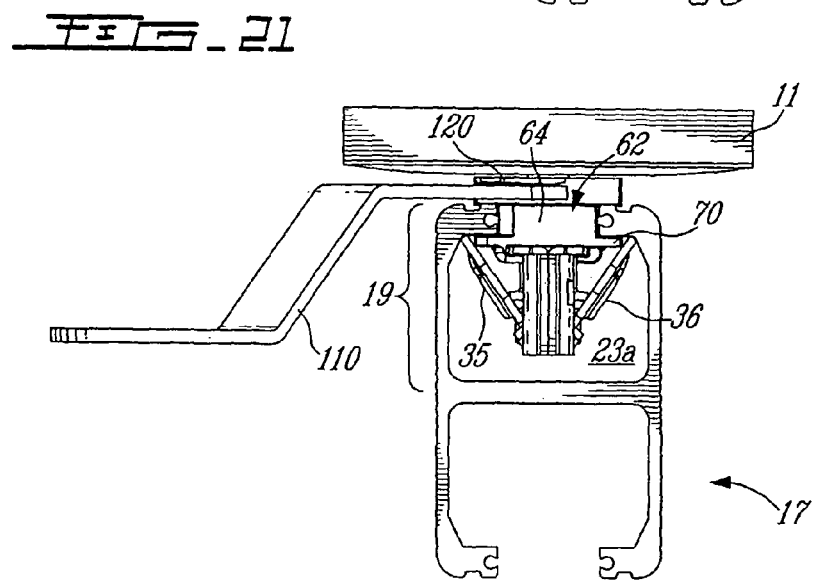
FIG. 22 is the same schematic partial sectional view shown in FIG. 20 but wherein the lateral stabilization component has been fully rotated and is wedged in the elongated slot opening of the mounting element.

Thus referring to FIGS. 18 to 22, these Figures show the rotation of the lateral stabilization element 5 by the tool 110 (which grips the head member 3) from an initial in longitudinally in-line position (see FIGS. 18 to 20) to an intermediate transverse position (FIG. 21) to the final more or less perpendicular disposition shown in FIG. 22. As may further be seen from FIGS. 20 to 22 as the tab members are rotated from their initial in-line position (i.e. in-line with the longitudinal extent of the slot opening) into their final transverse position they will tend to urge the wing plates 35, 36 apart to ensure that the upper edges 71 of the wing plates 35, 36 extend well into the holding cavity 23a under respective free edge portions 27, 29 of the retaining formation.

As may be understood from FIGS. 20 to 22, the head member 60 of the lateral stabilization element 5 is configured for being gripped by the tool 110 for the rotation of the lateral stabilization element 5 by the tool 110; rotation is in the direction of lowest resistance as provided by the diagonally rounded corners 68. The head member 60 is sized in longitudinal extent larger than the width of slot-like opening 25. The tool 110 has jaws which define an opening of shape complementary to the shape of the head component 3.

The insert member 62 also as may be seen from FIGS. 19 to 22 is configured such that the insert member 62

- is insertable into the slot-like (cavity) opening 25 when the long sides 64 of the insert member extend parallel to the longitudinal extent (axis 112) of the slot-like (cavity) opening 25, and
- is pivotable (i.e. rotatable) in the slot-like (cavity) opening 25 with respect to the longitudinal extent of the (cavity) opening 25 so as to dispose the long sides 64 of the insert member transverse to the longitudinal extent of the (cavity) opening 25 such that the short sides 66 of the insert member 62 engage the retaining formation defining the slot-like opening 25 (i.e. the free edge portions 27, 29 thereof) so as to (or for) inhibit(ing) lateral (sideways) movement of the mounting element 19 transverse (i.e. movement in a direction transverse (e.g. at right angles-perpendicular)) to the longitudinal extent of the track 17.

Figure 23:
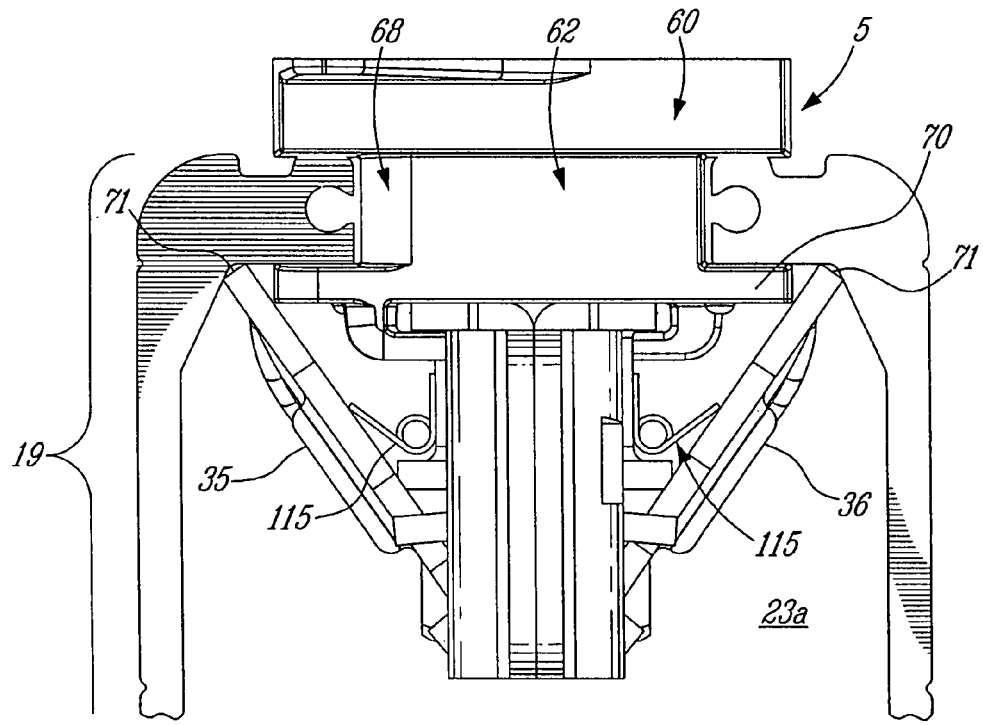
FIG. 23 is a partial schematic view as shown in FIG. 22 but wherein the head component is provided with bias means for biasing the wing plates in a flared configuration.

The insert member 62 as mentioned includes tab members 70. the tab members 70 are configured such that the tab members 70 are also insertable through the slot-like (cavity) opening 25 into the holding cavity 23a. The tab members 70, the wing blades 35, 36 and the retaining formation are configured such that when the tab members 70 are in the holding cavity 23a and the short sides 66 of the insert member 62 have been made to engage the free edge portions 27, 29 of the retaining formation, each wing blade 35, 36 is engaged by (i.e. sandwiched between) a respective tab member 70 and the retaining formation Although the above mentioned insert member 62 for the lateral stabilization component 5 is shown as being sized to wedge in the slot-like opening, the insert member 62 may, in an alternate embodiment, be sized smaller than the slot like opening 25. In this case the tab members 70 alone may not only serve to (if necessary) push apart and maintain the wing blades 35, 36 apart but also to engage the wing blade 35, 36 against the retaining formation (e.g. mounting element side walls) so as to (or for) inhibit(ing) lateral (sideways) movement of the mounting element 19 transverse (i.e. movement in a direction transverse (e.g. at right angles-perpendicular)) to the longitudinal extent of the track 17 i.e. to act as a stabilization component FIG. 23 illustrates a modified version of the example embodiment of the head component 3 shown in FIG. 3. The head component shown in FIG. 23 is the same as that shown in FIG. 3 except that the embodiment in FIG. 23 includes a pair of bias springs 115; the bias springs 115 are configured so as to tend to urge the wing plates 35, 36 to remain in the flared position but are so chosen that they do not interfere with the folding back of the wing plates 35, 36 as the head component is forced into the holding cavity 23a through the slot (cavity) opening 25.

Figure 24:
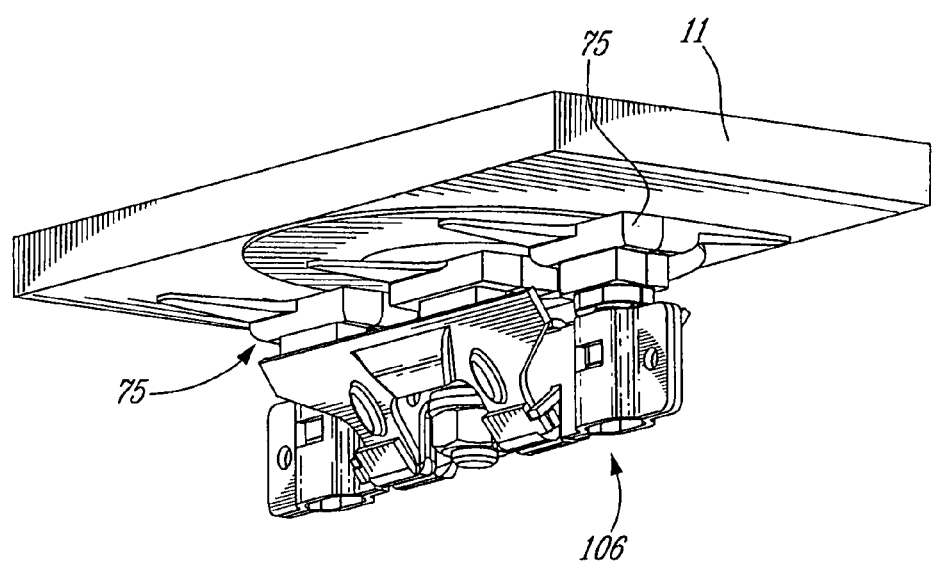
FIG. 24 is a perspective view of an alternate or modified example embodiment of the anchor assembly shown in FIG. 1 wherein the anchor assembly may be used to interconnect the ends of two adjacent example tracks
Figure 25:
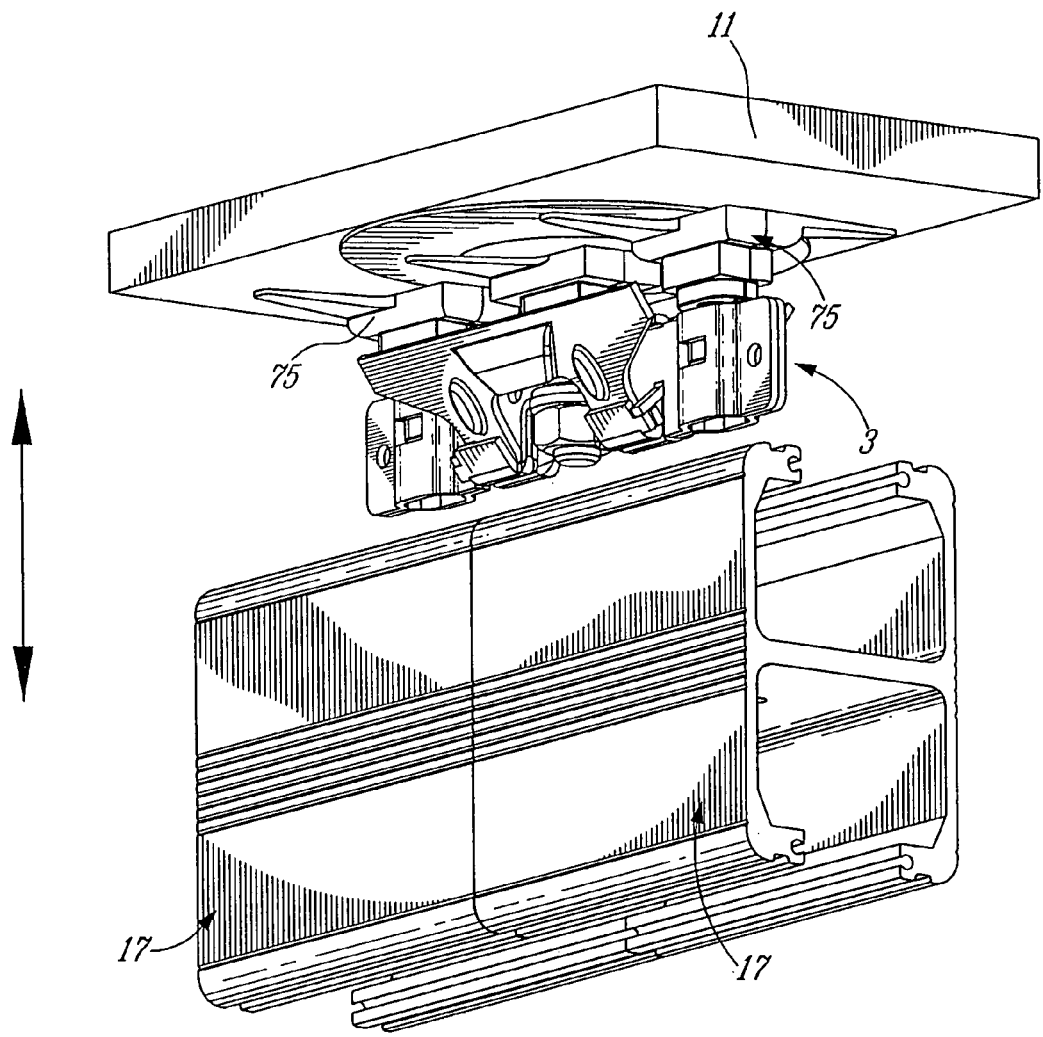
FIG. 25 is a perspective view of a pair of adjacent example tracks being mounted to the anchor assembly shown in FIG. 24.

Turning to FIGS. 24 to 27, these Figures illustrate the mounting of the adjacent ends of a pair of the tracks 17 (i.e. tracks 17 as described above with respect to FIGS. 12 to 14) using the alternate anchor assembly embodiment shown in FIG. 24; the embodiment being the same as that shown in FIGS. 1 and 11 except that the assembly includes a pair of brace members 75 as shown in FIG. 8. Initially the mounting process is the same as that discussed above with respect to FIGS. 12 to 14 and 20 to 22, i.e. the same steps are followed so as to wedge the insert member 62 of the lateral stabilization component 5 into the slot opening 25.

Referring to FIGS. 27, 29B, 30B and 31B, each brace member 75 is associated with a respective base member 77, 79. As mentioned above, each brace member 75 has a head member 81, an insert member 101, an intermediate member 83, a stem member 87 and a distal or foot engagement member 85.

Figure 26:
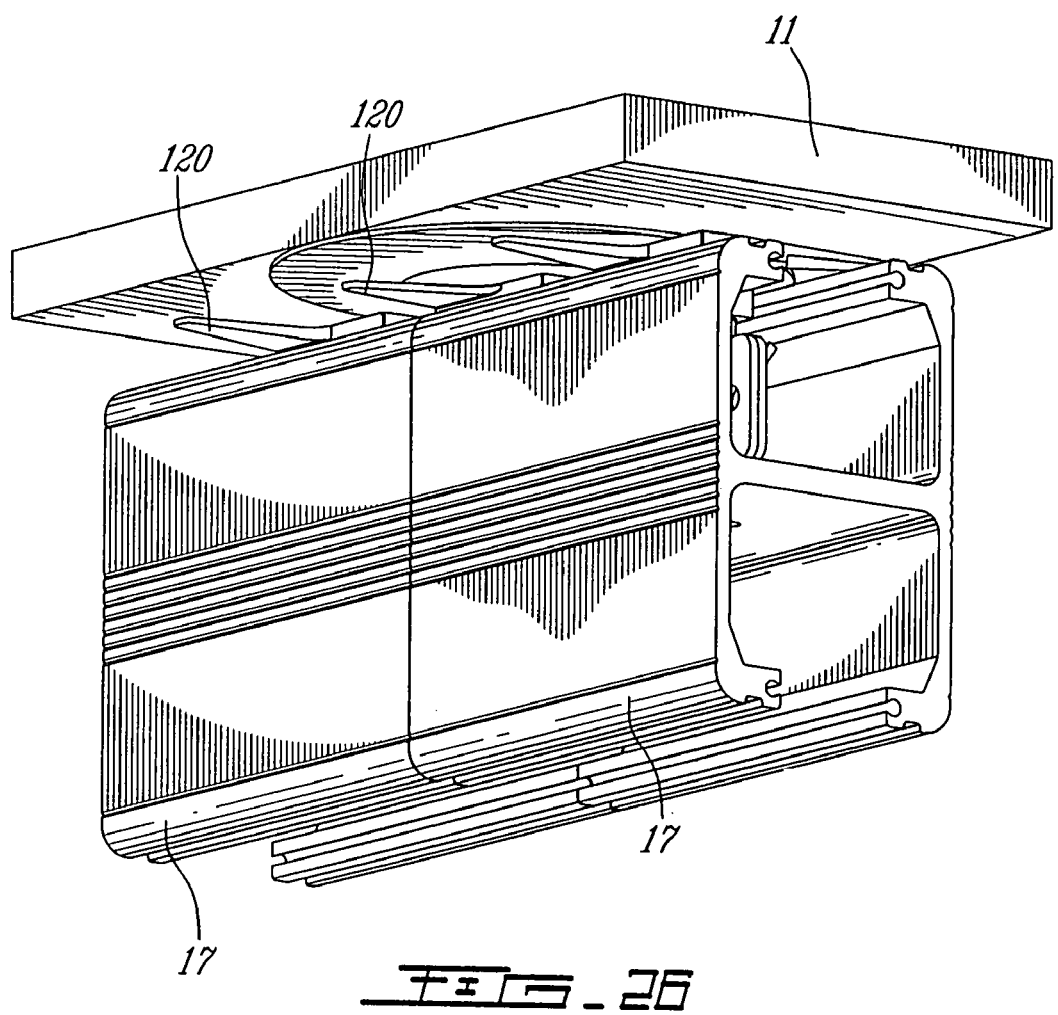
FIG. 26 is a perspective view of the pair of example tracks shown in FIG. 25 mounted to the anchor assembly shown in FIG. 24.
Figure 27:
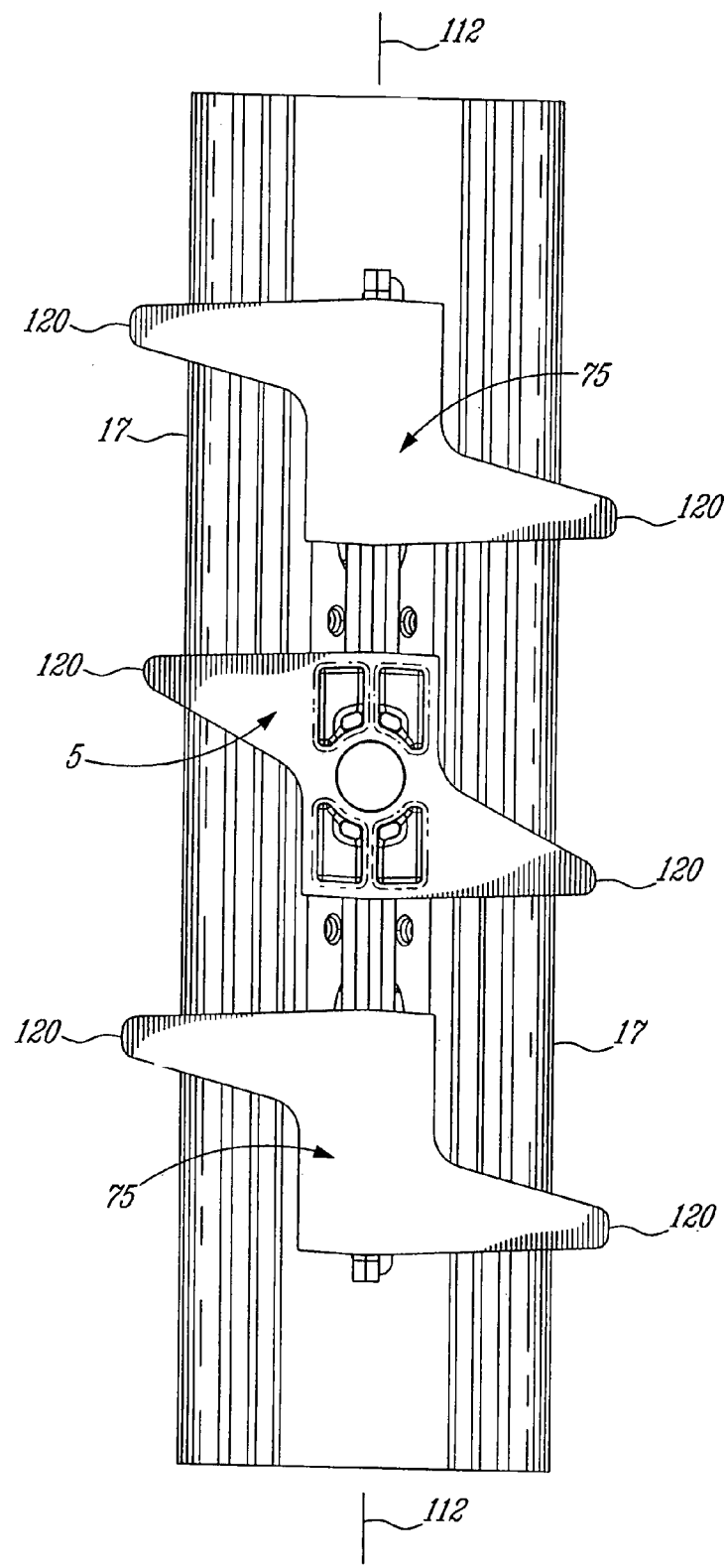
FIG. 27 is a top view of the anchor assembly and pair of tracks as shown in FIG. 26 with the false ceiling taken away.
Figure 28:
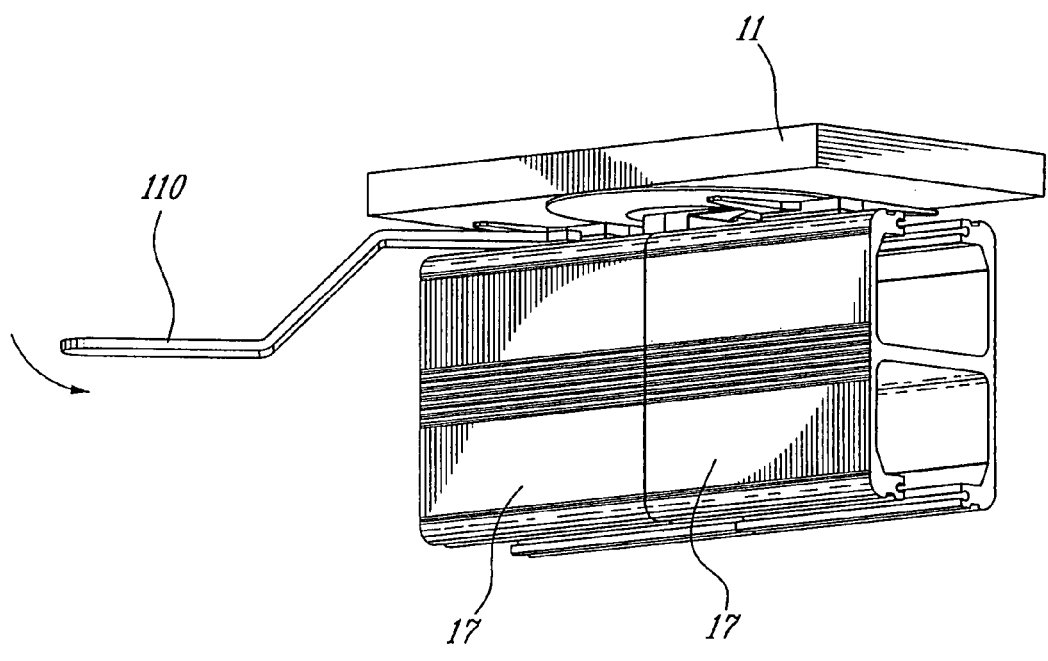
FIG. 28 is a perspective view the pair of tracks and anchor assembly as shown in FIG. 26 associated with turning tool for rotation of the lateral stabilization component.
Figure 30A:
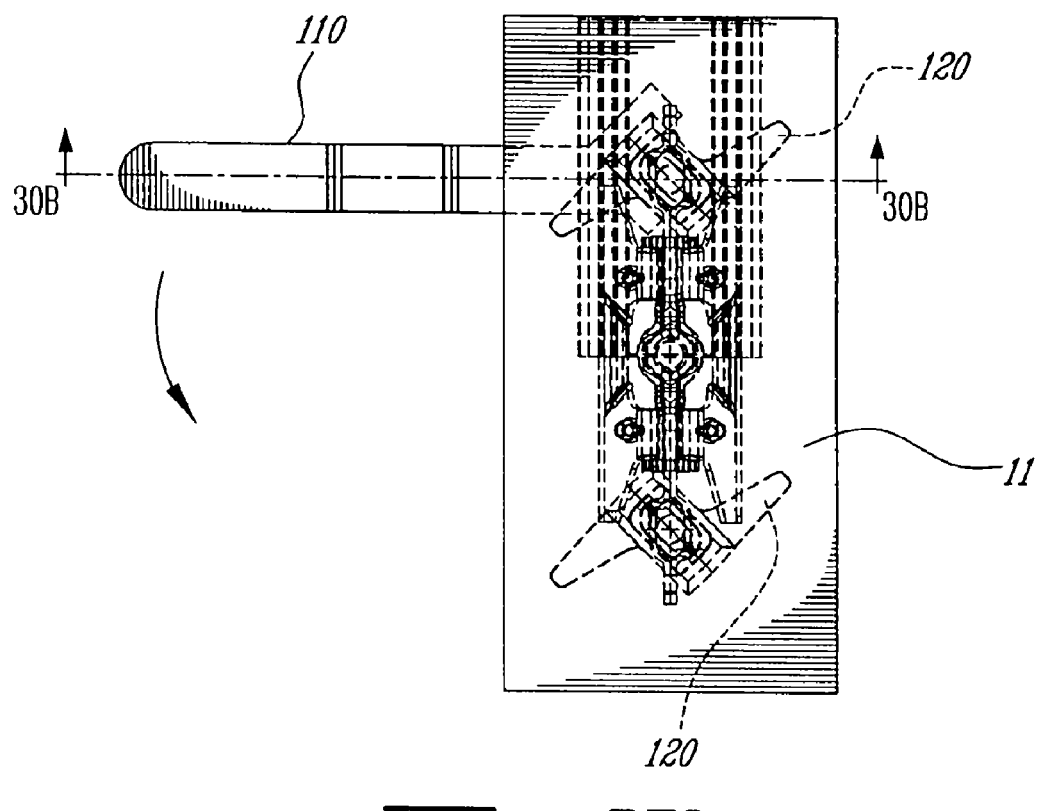
FIG. 30A is the same view as shown in FIG. 29A but wherein the brace member has been partially rotated for ultimate wedging in the elongated slot opening of the mounting element.
Figure 30B:
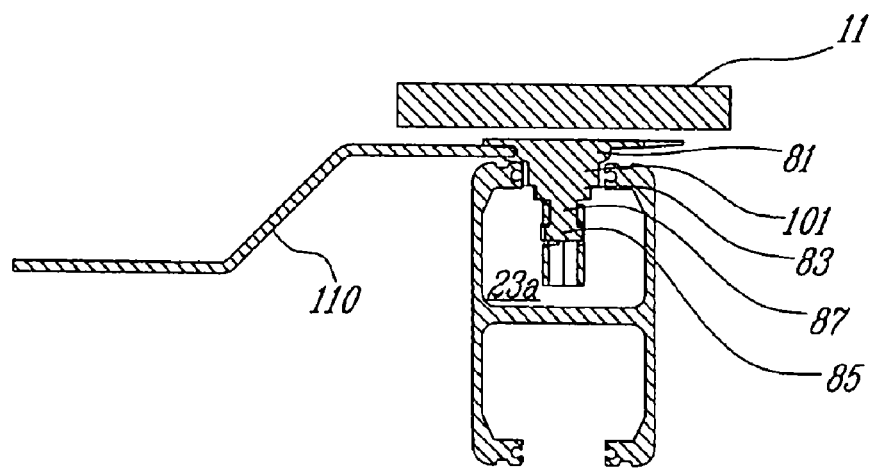
FIG. 30B is a schematic partial sectional view along 30B-30B of FIG. 30A.
Figure 31B:
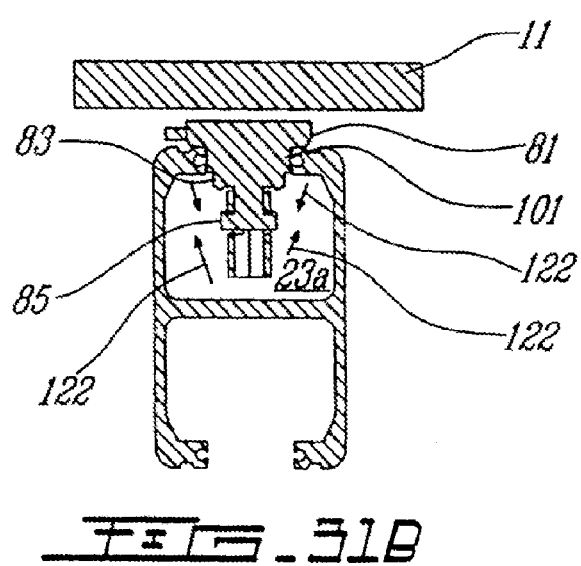
FIG. 31B is a schematic partial sectional view along 31B-31B of FIG. 31A.

FIGS. 26, 27 and 29A show each of the brace members 75 in the initial mounting configuration wherein the members such as the insert member 101 as well as the foot member 85 have their longitudinal extents aligned or lined up (i.e. in-line) with the longitudinal extent of the support member (see axis 112). Thus each foot member 85 is adjacent a respective pair of cam openings 95. As may be understood each brace member 75 and respective base member 77, 79 (including a respective cam member comprising paired slots 95) are configured such that the head member 81 of the brace member 75 is rotatable from the in-line position shown in the FIGS. 26, 27 and 29A to the transverse position (as shown in FIG. 31B). During such rotation the head member 81 is able to be brought into abutment with the outside surface of the portion of the free edge portions 27, 29 of the retaining formation defining the slot (cavity) opening 25. On the other hand, during such rotation the longitudinally opposed ends of the distal or foot engagement member 85 are each able to be pivotally (i.e. rotationally) inserted into a respective cam opening 95 so as to engage the upper cam surfaces 100 thereof. As the foot members 85 are disposed transverse to the axis 112 the brace member 75 acts against the upper cam surfaces 100 tending to place the stem member 87, etc. under tension stress. This tension stress act upon the support member 31 and connected pivot member(s) so as to urge the pivot member(s) to in turn urge the wing blades 35, 36 (not shown in FIGS. 29B, 30B and 31B) connected thereto against the retaining formation and thereby placing the wing blades 35, 36 under compression stress (in direction of the arrows 122) between the retaining formation and the pivot connect member(s) (i.e. the wing blades 35, 36 are sandwiched or clamped between the retaining formation and said pivot connect member(s)).

Referring more particularly to FIGS. 28, 29A-29B, 30A-30B, and 31A-31B, these figures illustrate the rotation of the brace member 75 by the same type tool 110 used for rotation of the lateral stabilization component 5 (which grips the head member) from an initial in longitudinally in-line position (see FIG. 29B) to an intermediate transverse position (FIG. 30B) to the final more or less perpendicular or transverse disposition shown in FIG. 31B. As discussed above, as the distal or foot engagement members 85 are rotated from their initial in-line position (i.e. in-line with the longitudinal extent of the Support member) into their final transverse position in the cam openings 95, they will tend to urge the support member 31 to urge the pivot members to in turn urge the upper edges 71 of the wing plates 35, 36 against the respective free edge portions 27, 29 of the retaining formation, i.e. sandwich or pinch the free edge portions 27, 29 between the head member 81 thereof and the wing plates 35, 36. The example embodiments of the anchor assembly have been discussed above by way of example with respect to a track 17 having an elongated slot (cavity) opening 25 extending the longitudinal length thereof. A track may of course be provide with any other suitable type of mounting element which provides suitable (cavity) opening(s) and holding cavities for mounting purpose; thus FIG. 32 shows another example embodiment of a track wherein the mounting element has a retaining formation structure that provides a plurality (i.e. one or more, e.g. two or more) of distinct elongated (cavity openings) 130.

Turning to FIGS. 33, 34 and 35, these figures illustrate example for attaching an elongated stem of a shank projecting out of a false ceiling 11 to an upper (ceiling) support structure. FIG. 33 shows the upper end of the stem 135 being attached to a concrete structure 137; the attachment may be by any known mechanism e.g. by a screw anchor disposed in a hole in the concrete surface, the end of the stem being provided with screw threads for being threaded into the anchor 136 so as to compress the anchor 136 against the hole wall. FIG. 34 shows a stem 135 being attached to a steel girder 140 by a bolt/washer combination 142, the end of the stem being provided with screw threads for engagement with corresponding threads of the bolt. FIG. 35 shows the stem 135 being attached to a wood beam 144, the end of the stem 135 having a screw configuration for being screwed directly into the wood beam 144 or into a starter hole initially drilled therein.

We claim:

1. A head component for an anchor assembly for mounting a load bearing track to a hanger component attached to an overhead structure, the track comprising a rail element and a mounting element, the mounting element comprising a retaining formation defining a holding cavity and a cavity opening communicating with the holding cavity, the holding cavity being sized larger than the cavity opening communicating therewith, the head component comprising a support member and a flarable member having a length extending upwardly from a foot pivotally affixed with respect to the support member to an upper edge, the length of the flarable member being situated adjacent to and facing the support member and being flarable therefrom, whereby the length of the flarable member is closer to the support member when unflared and further from the support member when flared, the head component being sized and configured such that the head component is able to pass through the cavity opening into the holding cavity wherein the flarable member is able to flare outwardly so as to present a flared formation in the holding cavity sized larger than the cavity opening so as to inhibit withdrawal of the head component in the holding cavity back through the cavity opening, wherein the head component has a lateral dimension in which the flarable member flares, and a length dimension perpendicular to the lateral dimension, and the support member is sized greater than the flarable member in the length dimension, such that the support member extends beyond the flarable member in the length dimension.

2. A head component as defined in claim 1 comprising a connection member for releasably connecting the support member to the hanger component.

3. An anchor assembly for mounting a load bearing track to an overhead structure, said track having a length dimension and comprising a rail element and a mounting element, said mounting element comprising one or more retaining formations, each retaining formation defining a holding cavity and an (cavity) opening communicating with the holding cavity, said holding cavity being sized larger than the (cavity) opening communicating therewith, the anchor assembly comprising a hanger component (shank) attachable to the overhead structure and a head component, said head component comprising a support member and a flarable member, said support member being connected to the hanger component, said flarable member having a length extending upwardly from a foot pivotally affixed with respect to the support member to an upper edge, the length of the flarable member being situated alongside and facing the support member and being flarable therefrom, said head component being sized and configured such that said head component is able to pass through a said (cavity) opening into said holding cavity wherein the flarable member is able to flare between:

(1) a flared formation in the holding cavity sized larger than the (cavity) opening, wherein the length of the flarable member is pivoted outwardly from the support member, so as to inhibit withdrawal of the head component in the holding cavity back through the opening, and (2) an unflared formation in the holding cavity sized smaller than the (cavity) opening, wherein the length of the flarable member is pivoted inwardly toward the support member, so as to allow withdrawal of the head component from the holding cavity back through the opening.

4. An anchor assembly as defined in claim 3 wherein said head component comprises a connection member for releasably connecting the support member to said hanger component.

5. An anchor assembly as defined in claim 3 comprising a lateral stabilization component, said lateral stabilization component comprising an attachment member connecting the lateral stabilization component to the hanger component, said lateral stabilization component being displaceable between a non-wedging configuration and a lodging or wedging configuration in the opening for inhibiting lateral movement of the mounting element transverse to the length dimension of the track.

6. A combination (kit), for mounting a load bearing track to an overhead structure, said load bearing track having a length dimension and comprising a rail element and a mounting element, said mounting element comprising one or more retaining formations, each retaining formation defining a holding cavity and a respective (cavity) opening communicating with the holding cavity, said holding cavity being sized larger than the respective (cavity) opening communicating therewith, said combination (kit) comprising one or more head components, each head component comprising a support member and a flarable member having a length extending upwardly from a foot pivotally affixed with respect to the support member to an upper edge, the length of the flarable member being situated alongside and facing the support member and being flarable therefrom, said head component being sized and configured such that said head component is able to pass through a respective (cavity) opening into said holding cavity wherein the flarable member is able to flare so as to present a flared formation in the holding cavity sized larger than the respective (cavity) opening so as to inhibit withdrawal of the head component in the holding cavity back through said respective (cavity) opening and one or more members selected from the class consisting of a hanger component for attaching a respective head component to the overhead structure and a section of said load bearing track.

7. A combination (kit) as defined in claim 6 wherein each head component comprises a connection member for (releasably) connecting the support member to a respective hanger component.

8. A combination (kit) as defined in claim 6 comprising one or more hanger component for attaching a respective head component to the overhead structure.

9. A combination (kit) as defined in claim 6 comprising one or more sections of said load bearing track.

10. A combination (kit) as defined in claim 9 wherein said rail element and said mounting element are integral.

11. A combination (kit) as defined in claim 6 comprising one or more hanger components for attaching a respective head component to the overhead structure and one or more sections of said load bearing track.

12. A combination (kit) as defined in claim 11 wherein said rail element and said mounting element are integral.

13. A combination (kit) as defined in claim 12 wherein said mounting element comprises an elongated retainer formation extending the length dimension of the track, said elongated retainer formation defining a slot-like (cavity) opening extending the length dimension of the track.

14. A combination as defined in claim 6 comprising one or more a lateral stabilization components, each said lateral stabilization component comprising an attachment member connecting the lateral stabilization component to a respective hanger component, said lateral stabilization component being displaceable between a non-wedging configuration and a lodging or wedging configuration in the slot-like (cavity) opening for inhibiting lateral movement of the mounting element transverse to the length dimension of the track.

15. A combination (kit) as defined in claim 6 wherein said one or more retainer formations each define a slot-like opening.

16. A head component for an anchor assembly, for mounting a load bearing track to a hanger component attached to an overhead structure the track comprising a rail element and an elongated mounting element, the mounting element comprising a retaining formation defining a holding cavity and a cavity opening communicating with the holding cavity, the holding cavity being sized larger than the opening communicating therewith and the cavity opening extending along the entirety of the length of the mounting element, the head component comprising a support member and a pair of opposed engagement wing blade members, each of the wing blade members being pivotally attached to the support member by a respective pivot connect member, each wing blade member having a length extending upwardly from the pivot connect member to an upper edge, the head component being sized and configured such that the head component is able to pass through the opening into the holding cavity wherein each of the wing blade members are able to pivot outwardly in the holding cavity so as to each engage the retaining formation to create a respective truss formation which acts as a reverse wedge to resist pull out of the head component from the holding cavity through the opening, the truss formation having a base chord defined by the retaining formation, a side chord defined by a respective blade member and a center strut defined by the support member.

17. A head component as defined in claim 16 comprising a connection member for releasably connecting the support member to the hanger component.

18. An anchor assembly for mounting a load bearing track to an overhead structure, said track having a length dimension comprising a rail element and a mounting element, said mounting element comprising one or more retaining formations, each retaining formation defining a holding cavity and an (cavity) opening communicating with the holding cavity, said holding cavity being sized larger than the (cavity) opening communicating therewith, the anchor assembly comprising a hanger component (shank) attachable to an overhead structure and a head component comprising a support member and a pair of opposed engagement wing blade members, each of the wing blade members being pivotally attached to the support member by a respective pivot connect member, each wing blade member having a length extending upwardly from the pivot connect member to an upper edge, the head component being sized and configured such that the head component is able to pass through the opening into the holding cavity wherein each of the wing blade members is able to pivot outwardly in the holding cavity to engage the retaining formation and thereby create a truss formation having a base chord defined by the retaining formation, a side chord defined by a respective blade member, and a center strut defined by the support member, said support member being connected to said hanger component.

19. An anchor assembly as defined in claim 18 wherein said head component comprises a connection member for releasably connecting the support member to said hanger component.

20. An anchor assembly as defined in claim 18 comprising a lateral stabilization component, said lateral stabilization component comprising an attachment member connecting the lateral stabilization component to the hanger component, said lateral stabilization component being displaceable between a non-wedging configuration and a lodging or wedging configuration in the (cavity) opening for inhibiting lateral movement of the mounting element transverse to the length dimension of the track.

21. An anchor assembly as defined in claim 18 wherein the (cavity) opening has a slot-like configuration and a length dimension, the anchor assembly further comprising a lateral stabilization component, said lateral stabilization component comprising a head member, for gripping the lateral stabilization element for the rotation thereof, and an insert member extending from said head member, said insert member having a rectangular configuration and comprising a pair of opposed outer long sides and a pair of opposed outer short sides said insert member being configured such that said insert member is insertable into the slot-like opening when the long sides of the insert member extend parallel to the length dimension of the slot-like opening, and is pivotable-rotatable in the slot-like opening with respect to the length dimension of the opening so as to dispose the long sides of the insert member transverse to the length dimension of the rail such that the short sides of the insert member engage the retaining formation defining the slot-like opening so as to (or for) inhibit(ing) lateral (sideways) movement of the mounting element transverse to the length dimension of the track.

22. An anchor assembly as defined in claim 21 wherein the hanger component comprises a shank member having a length dimension, said head and insert members define a sleeve body having a sleeve opening, said shank member extending through said sleeve opening, said sleeve body and said shank member being configured for rotational displacement of the lateral stabilization component about the length dimension of the shank member.

23. An anchor assembly as defined in claim 21 wherein the insert member comprises a pair of opposed tab members, each tab member extending from a respective short side of the insert member, said insert member being configured such that said tab members are insertable through the slot-like (cavity) opening into the holding cavity, said tab members, said wing blades and said retaining formation being configured such that when the tab members are in the holding cavity and the short sides of the insert member are made to engage the retaining formation each wing blade member is engaged by a respective tab member and the retaining formation.

24. An anchor assembly as defined in claim 18 comprising a compression inducing component for placing the wing blade members under compression stress between the retaining formation and said pivot connect member.

25. An anchor assembly as defined in claim 18 comprising a stabilization component, the stabilization component comprising a head member, for gripping the stabilization element for the rotation thereof, and an insert member extending from said head member, the insert member comprising a pair of opposed tab members spaced apart from the head member, said insert member and the opening being configured such that said insert member including said tab members is insertable into opening with the tab members extending parallel to the longitudinal axis-direction of the rail such that said tab members are insertable through the slot-like opening into the holding cavity, and said tab members, said blade members and said retaining formation being configured such that when the tab members are in the holding cavity said insert member including said tab members is pivotable-rotatable with respect to the length dimension of the opening so as to dispose the tab members transverse to the longitudinal axis of the rail such that each blade member is engaged by a respective tab member and the retaining formation.

26. A combination (kit), for mounting a load bearing track to an overhead structure, said load bearing track having a length dimension and comprising a rail element and a mounting element, said mounting element comprising one or more retaining formations, each retaining formation defining a holding cavity and a respective (cavity) opening communicating with the holding cavity, said holding cavity being sized larger than the respective (cavity) opening communicating therewith, said combination (kit) comprising one or more head components, each head component comprising a support member and a pair of opposed engagement wing blade members, each of the wing blade members being pivotally attached to the support member by a respective pivot connect member, each wing blade member having a length extending upwardly from the pivot connect member to an upper edge, the head component being sized and configured such that the head component is able to pass through the opening into the holding cavity wherein each of the wing blade members is able to pivot outwardly in the holding cavity to engage the retaining formation and thereby create a truss formation having a base chord defined by the retaining formation, a side chord defined by a respective blade member, and a center strut defined by the support member, and one or more members selected from the class consisting of a hanger component for attaching a respective head component to the overhead structure and a section of said load bearing track.

27. A combination (kit) as defined in claim 26 wherein each head component comprises a connection member for (releasably) connecting the support member to a respective hanger component.

28. A combination (kit) as defined in claim 26 comprising one or more hanger component for attaching a respective head component to the overhead structure.

29. A combination (kit) as defined in claim 26 further comprising one or more sections of said load bearing track.

30. A combination (kit) as defined in claim 26 wherein said rail element and said mounting element are integral.

31. A combination (kit) as defined in claim 26 comprising one or more hanger components for attaching a respective head component to the overhead structure and one or more sections of said load bearing track.

32. A combination (kit) as defined in claim 31 wherein said rail element and said mounting element are integral.

33. A combination (kit) as defined in claim 32 wherein said one or more retainer formations each define a slot-like opening.

34. A combination (kit) as defined in claim 32 wherein said mounting element comprises an elongated retainer formation extending the length of the rail element, said elongated retainer formation defining a slot-like opening extending the length of the rail element.

35. A combination (kit) as defined in claim 26 comprising one or more lateral stabilization component, each said lateral stabilization component comprising an attachment member connecting the lateral stabilization component to a respective hanger component, said lateral stabilization component being displaceable between a non-wedging configuration and a lodging or wedging configuration in the (cavity) opening for inhibiting lateral movement of the mounting element transverse to the length dimension of the track.

36. A combination (kit) as defined in claim 26 wherein a respective (cavity) opening has a slot-like configuration and a length dimension, said combination comprising one or more lateral stabilization components, each lateral stabilization component comprising a head member, for gripping the lateral stabilization element for the rotation thereof, and an insert member extending from said head member, said insert member having a rectangular configuration and comprising a pair of opposed outer long sides and a pair of opposed outer short sides said insert member configured such that said insert member is insertable into a respective slot-like (cavity) opening when the long sides of the insert member extend parallel to the length dimension of the slot-like (cavity) opening, and is pivotable-rotatable in the slot-like (cavity) opening with respect to the length dimension of the opening so as to dispose the long sides of the insert member transverse to the length dimension of the rail such that the short sides of the insert member engage the retaining formation defining the slot-like (cavity) opening so as to (or for) inhibit(ing) lateral (sideways) movement of the mounting element transverse to the length dimension of the track.

37. A combination (kit) as defined in claim 36 wherein the hanger component comprises a shank member having a length dimension, said head and insert members defining a sleeve body having a sleeve opening, said shank member extending through said sleeve opening, said sleeve body and said shank member being configured for rotational displacement of the lateral stabilization component about the length dimension of the shank member.

38. A combination (kit) as defined in claim 36 wherein the insert member comprises a pair of opposed tab members, each tab member extending from a respective short side of the insert member, said insert member including said tab members being configured such that said tab members are insertable through the slot-like opening into the holding cavity, said tab members, said blade members and said retaining formation being configured such that when the tab members are in the holding cavity and the short sides of the insert member engage the retaining formation each wing blade member is engaged a respective tab member and the retaining formation.

39. A combination (kit) as defined in claim 26 comprising a compression inducing component for placing the wing blade members under compression stress between the retaining formation and said pivot connect member.

40. A combination (kit) as defined in claim 26 comprising one or more stabilization components, each stabilization component comprising a head member, for gripping the stabilization element for the rotation thereof, and an insert member extending from said head member, the insert member comprising a pair of opposed tab members spaced apart from the head member, said insert member and the opening being configured such that said insert member including said tab members is insertable into opening with the tab members extending parallel to the longitudinal axis-direction of the rail such that said tab members are insertable through the slot-like opening into the holding cavity, and said tab members, said wing blade members and said retaining formation being configured such that when the tab members are in the holding cavity said insert member including said tab members is pivotable-rotatable with respect to the length dimension of the opening so as to dispose the tab members transverse to the longitudinal axis of the rail such that each wing blade member is engaged by a respective tab member and the retaining formation.

41. A head component as defined in claim 16 comprising stop elements for limiting each of the wing blade members to a predetermined degree of rotation relative to the support member, wherein the wing blade members pivot into contact with the stop elements when the wing blade members pivot outwardly.

42. An anchor assembly as defined in claim 18 wherein said head component comprises stop elements for limiting each of the wing blade members to a predetermined degree of rotation relative to the support member, wherein the wing blade members pivot into contact with the stop elements when the wing blade members pivot outwardly.

43. A head component as defined in claim 1 wherein the flarable member includes toe elements extending in opposite directions, and the support member includes opposing spaced openings which rotatably receive the toe elements.

44. A head component as defined in claim 1 wherein the flarable member increases in size along the length dimension as the flarable member extends from the location at which the flarable member attaches to the support member.

45. A head component as defined in claim 1 wherein the support member includes a stop element protruding therefrom adjacent the location at which the flarable member attaches to the support member, the stop member being spaced from the flarable member when the flarable member is unflared, and the stop member interfering with the flarable member as the flarable member flares outwardly from the support member, whereby the stop element delimits the extent to which the flarable member flares outwardly from the support member.

46. A head component as defined in claim 1 wherein the support member has a downwardly-extending attachment opening extending through the height of the support member, with the flarable member pivotally affixing to the support member on opposing sides of the attachment opening.

47. A head component as defined in claim 1 wherein the support member includes a downwardly-extending attachment opening, and also includes a downwardly-extending primary opening spaced from the attachment opening.

48. A head component as defined in claim 1 wherein the support member has a downwardly-extending attachment opening extending through the height of the support member, further comprising a hanger component affixed within the attachment opening, the hanger component being attached to a ceiling structure.

49. The head component as defined in claim 48 further comprising a lateral stabilization component rotatably mounted on the hanger component between the support member and the ceiling structure, the lateral stabilization component bearing gripping wings extending outwardly therefrom to extend alongside the ceiling structure.

50. A head component as defined in claim 1 further comprising an elongated track having a rail element and a mounting element, the mounting element having a retaining formation defining a holding cavity and a cavity opening communicating with the holding cavity, the holding cavity being sized larger than the cavity opening communicating therewith, and the cavity opening extending along the entirety of the length of the track, wherein the flarable member is flared outwardly within the holding cavity.

51. A head component as defined in claim 16 wherein the head component has a lateral dimension in which the wing blade members pivot, and a length dimension perpendicular to the lateral dimension, with the support member being sized greater than the wing blade members in the length dimension, such that the support member extends beyond the wing blade members in the length dimension.

52. A head component as defined in claim 51 wherein each wing blade member increases in size along the length dimension as each wing blade member extends from its pivot connect member.

53. A head component as defined in claim 16 wherein the support member includes stop elements protruding therefrom, each stop member protruding adjacent one of the pivot connect members, and each stop member interfering with one of the wing blade members as the wing blade member pivots outwardly and being spaced from the one of the wing blade members as the wing blade member pivots inwardly, whereby the stop element delimits the extent to which the wing blade member pivots.

54. A head component as defined in claim 16 wherein the support member has a downwardly-extending attachment opening extending through the height of the support member, with each wing blade member pivotally affixing to the support member on opposing sides of the attachment opening.

55. A head component as defined in claim 16 wherein the support member includes a downwardly-extending attachment opening, and also includes a downwardly-extending primary opening spaced from the attachment opening.

56. A head component as defined in claim 16 wherein the support member has a downwardly-extending attachment opening extending through the height of the support member, further comprising a hanger component affixed within the attachment opening, the hanger component being attached to a ceiling structure.

57. The head component as defined in claim 56 further comprising a lateral stabilization component rotatably mounted on the hanger component between the support member and the ceiling structure, the lateral stabilization component bearing gripping wings extending outwardly therefrom to extend alongside the ceiling structure.

* * * * *